(12) United States Patent
Lynde

(10) Patent No.: US 11,044,095 B2
(45) Date of Patent: Jun. 22, 2021

(54) DEBT RECORDATION TO BLOCKCHAINS

(71) Applicant: Factom, Inc., Austin, TX (US)

(72) Inventor: Zachary Lynde, Austin, TX (US)

(73) Assignee: Factom, Inc., Austin, TX (US)

( * ) Notice: Subject to any disclaimer, the term of this patent is extended or adjusted under 35 U.S.C. 154(b) by 321 days.

(21) Appl. No.: 16/191,585

(22) Filed: Nov. 15, 2018

(65) Prior Publication Data

US 2020/0044856 A1 Feb. 6, 2020

Related U.S. Application Data

(60) Provisional application No. 62/714,909, filed on Aug. 6, 2018, provisional application No. 62/743,061, filed on Oct. 9, 2018.

(51) Int. Cl.
*H04L 9/32* (2006.01)
*H04L 9/06* (2006.01)
*G06Q 20/10* (2012.01)
*H04L 9/30* (2006.01)

(52) U.S. Cl.
CPC ......... *H04L 9/3236* (2013.01); *G06Q 20/102* (2013.01); *H04L 9/0618* (2013.01); *H04L 9/30* (2013.01); *H04L 2209/38* (2013.01); *H04L 2209/56* (2013.01)

(58) Field of Classification Search
CPC ....... H04L 9/3236; H04L 9/0618; H04L 9/30; H04L 2209/38; H04L 2209/56; G06Q 20/102
See application file for complete search history.

(56) References Cited

U.S. PATENT DOCUMENTS

| 4,309,569 | A | 1/1982 | Merkle |
| 5,499,294 | A | 3/1996 | Friedman |
| 5,862,218 | A | 1/1999 | Steinberg |
| 5,966,446 | A | 10/1999 | Davis |
| 7,572,179 | B2 | 8/2009 | Choi et al. |
| 7,729,950 | B2 | 6/2010 | Mendizabal et al. |

(Continued)

FOREIGN PATENT DOCUMENTS

| DE | 10128728 | 1/2003 |
| JP | 5383297 | 1/2014 |

(Continued)

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.

(Continued)

*Primary Examiner* — Joseph P Hirl
*Assistant Examiner* — Stephen T Gundry
(74) *Attorney, Agent, or Firm* — Scott P. Zimmerman, PLLC

(57) ABSTRACT

Accounts receivables, accounts payables, and other debt instruments are registered to blocks of data in a blockchain. The blockchain may then be dispersed to subscribers for inspection. Any subscriber may inspect the blockchain, evaluate the debt instruments registered to the blockchain, and conduct automated, electronic purchases of any debt instruments. Smart, digital contracts executed by the blockchain may automate purchase of the debt instruments.

20 Claims, 42 Drawing Sheets

(56) References Cited

U.S. PATENT DOCUMENTS

| | | | |
|---|---|---|---|
| 8,245,038 | B2 | 8/2012 | Golle et al. |
| 8,266,439 | B2 | 9/2012 | Haber et al. |
| 8,442,903 | B2 | 5/2013 | Zadoorian et al. |
| 8,560,722 | B2 | 10/2013 | Gates et al. |
| 8,706,616 | B1 | 4/2014 | Flynn |
| 8,712,887 | B2 | 4/2014 | DeGroeve et al. |
| 8,867,741 | B2 | 10/2014 | McCorkindale et al. |
| 8,943,332 | B2 | 1/2015 | Horne et al. |
| 9,124,423 | B2 | 9/2015 | Jennas, II et al. |
| 9,396,006 | B2 | 7/2016 | Kundu et al. |
| 9,407,431 | B2 | 8/2016 | Bellare et al. |
| 9,411,524 | B2 | 8/2016 | O'Hare et al. |
| 9,411,976 | B2 | 8/2016 | Irvine |
| 9,411,982 | B1 | 8/2016 | Dippenaar et al. |
| 9,424,576 | B2 | 8/2016 | Vandervort |
| 9,436,935 | B2 | 9/2016 | Hudon |
| 9,472,069 | B2 | 10/2016 | Roskowski |
| 9,489,827 | B2 | 11/2016 | Quinn et al. |
| 9,722,790 | B2 | 8/2017 | Ebrahimi |
| 9,876,646 | B2 | 1/2018 | Ebrahimi et al. |
| 9,882,918 | B1 | 1/2018 | Ford et al. |
| 2003/0018563 | A1 | 1/2003 | Kilgour et al. |
| 2004/0085445 | A1 | 5/2004 | Park |
| 2005/0206741 | A1 | 9/2005 | Raber |
| 2006/0075228 | A1 | 4/2006 | Black et al. |
| 2006/0184443 | A1 | 8/2006 | Erez et al. |
| 2007/0094272 | A1 | 4/2007 | Yeh |
| 2007/0296817 | A1 | 12/2007 | Ebrahimi et al. |
| 2008/0010466 | A1 | 1/2008 | Hopper |
| 2009/0025063 | A1 | 1/2009 | Thomas |
| 2009/0287597 | A1 | 11/2009 | Bahar |
| 2010/0049966 | A1 | 2/2010 | Kato |
| 2010/0058476 | A1 | 3/2010 | Isoda |
| 2010/0161459 | A1 | 6/2010 | Kass et al. |
| 2010/0241537 | A1 | 9/2010 | Kass et al. |
| 2013/0222587 | A1 | 8/2013 | Roskowski |
| 2014/0229738 | A1 | 8/2014 | Sato |
| 2014/0344015 | A1 | 11/2014 | Puertolas-Montasnes et al. |
| 2016/0071096 | A1 | 3/2016 | Rosca |
| 2016/0119134 | A1 | 4/2016 | Hakoda et al. |
| 2016/0148198 | A1 | 5/2016 | Kelley |
| 2016/0162897 | A1 | 6/2016 | Feeney |
| 2016/0217436 | A1 | 7/2016 | Brama |
| 2016/0253663 | A1 | 9/2016 | Clark et al. |
| 2016/0260091 | A1 | 9/2016 | Tobias |
| 2016/0267472 | A1 | 9/2016 | Lingham et al. |
| 2016/0267558 | A1 | 9/2016 | Bonnell et al. |
| 2016/0275294 | A1 | 9/2016 | Irvine |
| 2016/0283920 | A1 | 9/2016 | Fisher et al. |
| 2016/0292396 | A1 | 10/2016 | Akerwall |
| 2016/0292672 | A1 | 10/2016 | Fay et al. |
| 2016/0292680 | A1 | 10/2016 | Wilson, Jr. et al. |
| 2016/0300200 | A1 | 10/2016 | Brown et al. |
| 2016/0300234 | A1 | 10/2016 | Moss-Pultz et al. |
| 2016/0321675 | A1 | 11/2016 | McCoy et al. |
| 2016/0321751 | A1 | 11/2016 | Creighton, IV et al. |
| 2016/0328791 | A1 | 11/2016 | Parsells et al. |
| 2016/0330031 | A1 | 11/2016 | Drego et al. |
| 2016/0330244 | A1 | 11/2016 | Denton |
| 2016/0337119 | A1 | 11/2016 | Hosaka et al. |
| 2016/0342977 | A1 | 11/2016 | Lam |
| 2016/0342989 | A1 | 11/2016 | Davis |
| 2016/0344737 | A1 | 11/2016 | Anton et al. |
| 2017/0005797 | A1 | 1/2017 | Lanc et al. |
| 2017/0053249 | A1* | 2/2017 | Tunnell ............ G06Q 20/382 |
| 2017/0061396 | A1* | 3/2017 | Melika ............ G06Q 20/384 |
| 2017/0124534 | A1 | 5/2017 | Savolainen |
| 2017/0124535 | A1* | 5/2017 | Juels ............ G06Q 20/0655 |
| 2017/0177898 | A1* | 6/2017 | Dillenberger ........ H04L 9/3236 |
| 2017/0213287 | A1* | 7/2017 | Bruno ............ H04L 9/0637 |
| 2017/0243208 | A1* | 8/2017 | Kurian ............ G06Q 20/40 |
| 2017/0243289 | A1 | 8/2017 | Rufo |
| 2017/0244757 | A1* | 8/2017 | Castinado ............ H04L 9/3236 |
| 2017/0330279 | A1 | 11/2017 | Ponzone |
| 2017/0352031 | A1* | 12/2017 | Collin ............ G06Q 30/06 |
| 2017/0373859 | A1 | 12/2017 | Shors et al. |
| 2018/0075527 | A1* | 3/2018 | Nagla ............ G06Q 40/025 |
| 2018/0091524 | A1* | 3/2018 | Setty ............ H04L 9/0643 |
| 2018/0097779 | A1* | 4/2018 | Karame ............ G06Q 20/382 |
| 2018/0167201 | A1* | 6/2018 | Naqvi ............ H04L 63/0861 |
| 2018/0204213 | A1* | 7/2018 | Zappier ............ H04L 63/10 |
| 2018/0285971 | A1* | 10/2018 | Rosenoer ............ G06N 20/00 |
| 2019/0197532 | A1* | 6/2019 | Jayachandran .... G06Q 20/3829 |
| 2019/0253258 | A1* | 8/2019 | Thekadath ............ G06Q 20/02 |
| 2020/0034813 | A1* | 1/2020 | Calinog ............ G06Q 20/22 |
| 2020/0042960 | A1* | 2/2020 | Cook ............ G06F 16/27 |
| 2020/0065761 | A1* | 2/2020 | Tatchell ............ G06Q 20/3825 |
| 2020/0145219 | A1* | 5/2020 | Sebastian ............ H04L 63/0861 |

FOREIGN PATENT DOCUMENTS

| | | |
|---|---|---|
| KR | 100653512 | 12/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

Crosby, Michael et al., "BlockChain Technology, Beyond Bitcoin", Sutardja Center for Entrepreneurship & Technology, Berkeley Engineering, Oct. 16, 2015, 35 pages.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Chakravorty, Antorweep, and Chunming Rong, "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Al-Naji, Nader et al., "Basis: A Price-Stable Cryptocurrency with an Algorithmic Central Bank" www.basis.io Jun. 20, 2017, 27 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

\* cited by examiner

DEBT RECORDATION TO BLOCKCHAINS

CROSS-REFERENCE TO RELATED APPLICATIONS

This application claims domestic benefit of U.S. Provisional Application No. 62/743,061 filed Oct. 9, 2018 and incorporated herein by reference in its entirety.

BACKGROUND

Liquidity can be a problem for suppliers. When any supplier of a product or service wishes to grow, cash is usually required for inventory, equipment, and operations. Cash liquidity, though, is often inadequate, especially for a small business. Many suppliers will thus sell accounts receivables (e.g., debt) in credit markets to raise cash. These debt or credit markets, though, are costly and may require high interest rates. What is needed, then, is a marketplace with reduced transaction costs.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 27-31 further illustrate the blockchain data layer, according to exemplary embodiments;

FIGS. 32-35 are more detailed illustrations of the account receivable, according to exemplary embodiments;

DETAILED DESCRIPTION

Figure 1:
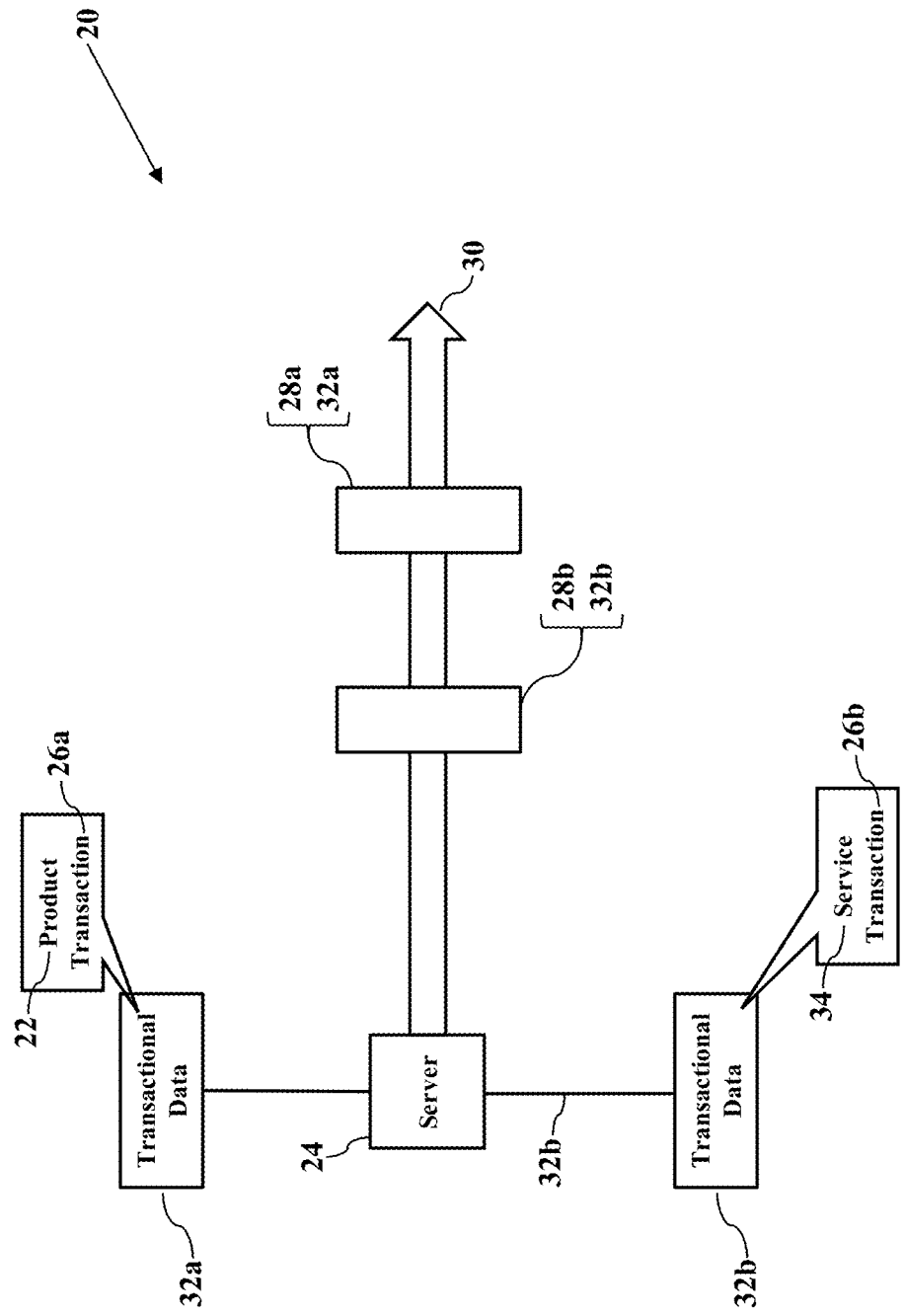
FIGS. 1-21 are simplified illustrations of a blockchain marketplace, according to exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-21 are simplified illustrations of a blockchain marketplace 20, according to exemplary embodiments. The blockchain marketplace 20 records electronic transactions of goods and/or services. For example, when any product 22 is bought, sold, contracted, or loaned, a server 24 records the corresponding electronic transaction 26a to a block 28a of data in a blockchain 30. The block 28a of data may describe any electronic transactional data 32a associated with the transaction 26a, such as the buyer/seller, date, purchase/sale amount, and even location (such as GPS coordinates). Similarly, whenever any service 34 is bought, sold, contracted, or bartered, the server 24 may record that corresponding transaction 26b to the block 28b of data in the blockchain 30, and the block 28b of data may document the corresponding electronic transactional data 32b.

Figure 2:
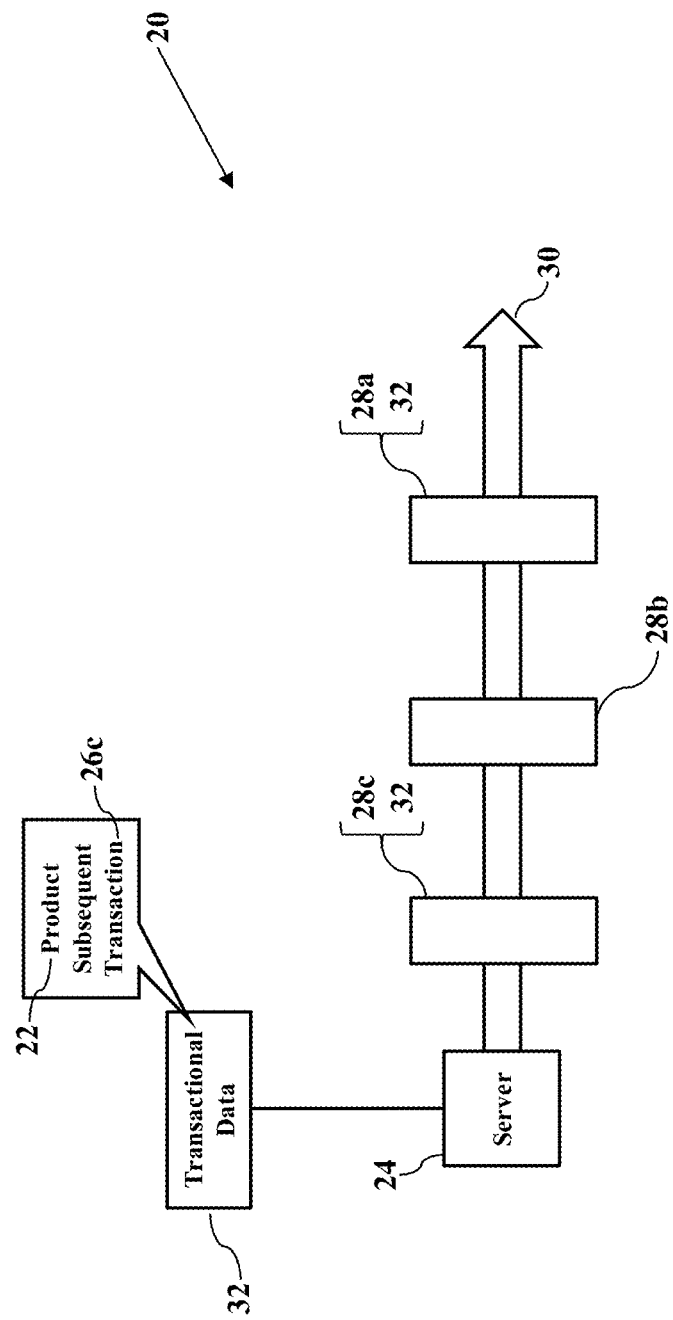

FIG. 2 illustrates subsequent transfers. Here exemplary embodiments may record second-hand, third-hand, and other sales of the product 22. As the reader may understand, an original owner of the product 22, for many reasons, may later sell the product 22 to another party. These subsequent transactions are common in homes, vehicles, antiques, and jewelry. Regardless, whenever the product 22 is subsequently bought, sold, contracted, or loaned, the corresponding transaction 26c is recorded to still another block 28c of data in the blockchain 30. The block 28c of data may again record any electronic transactional data 32 associated with the transaction 26c, such as the buyer, the seller, the date, and the purchase/sale amount. Simply put, whenever the product 22 is transferred, each transfer may be recorded to any of the blocks 28 of data within the blockchain 30. The blockchain 30 thus creates a distributed, immutable ledger that provides evidentiary documentation of each transfer of the product 22.

Figure 3:
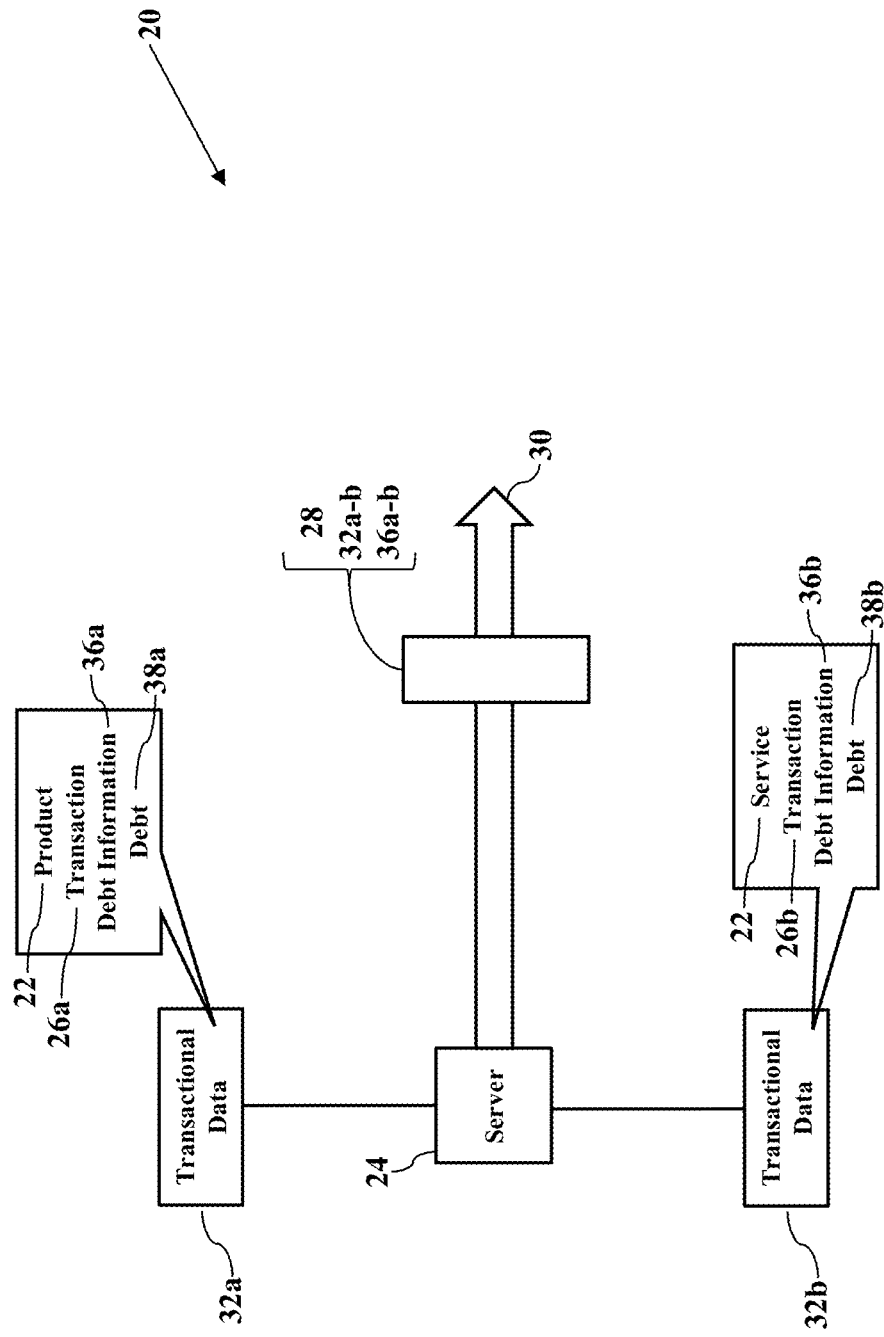

FIG. 3 illustrates debt recordations. Here the blockchain 30 may also register debts, loans, liens, lines of credit, and any other electronic debt information 36a. As the reader may understand, when the product 22 is sold, a debt 38a may be incurred. The purchaser may obtain a loan to fund the purchase, especially for high-dollar products (such as homes, vehicles, and jewelry). Usually some form of collateral backs the loan, which may be the product 22 itself. Regardless, the block 28 of data may also record any of the electronic transactional data 32a and/or the electronic debt information 36a associated with the transaction 26a, such as the bank, credit union, financial institution, or private entity that funds or backs the debt. Moreover, the electronic debt information 36a may also describe payment terms, length or number of payments, interest rate, and a beginning or original balance. Similarly, if the debt 38b is incurred for the service 34, exemplary embodiments may record the corresponding electronic transactional data 32b and/or the electronic debt information 36b to the block 28 of data in the blockchain 30. The blockchain marketplace 20 thus creates a distributed, immutable ledger that provides evidentiary documentation of the debt 38 and its terms.

Figure 4:
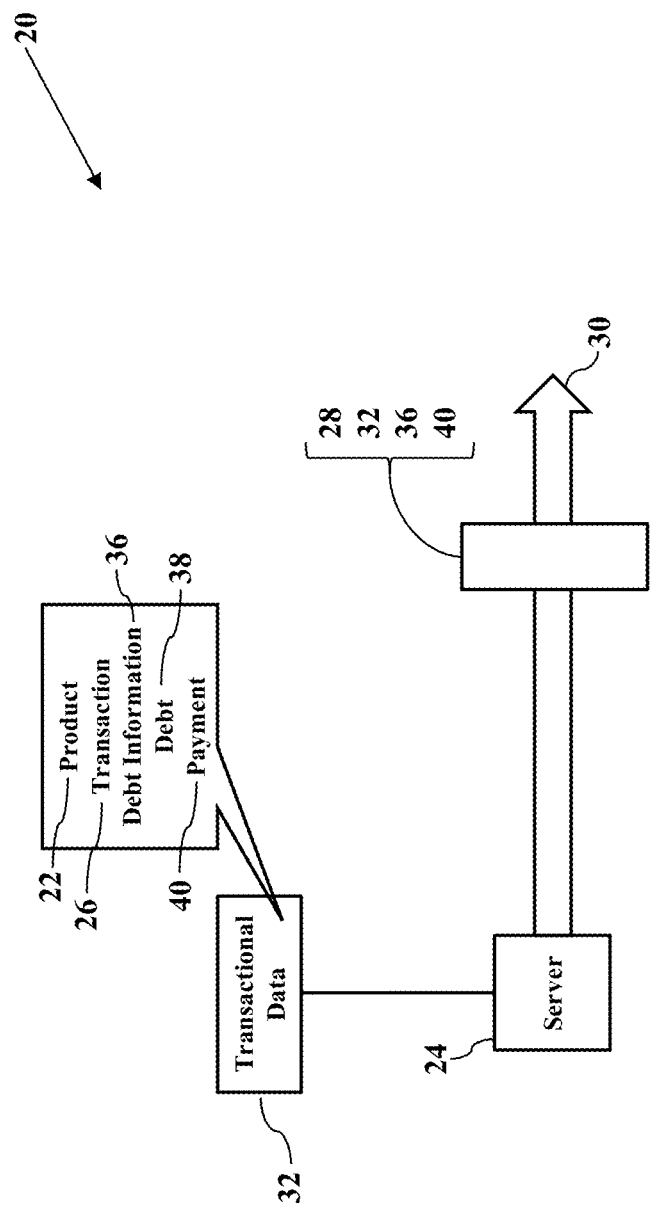

FIG. 4 illustrates debt updates. After the blockchain 30 records the initial electronic debt information 36, subsequent payments 40 may also be recorded. Again, as the reader may understand, when the purchaser accepts a loan for the product 22, one or more payments 40 may be required (as is common for homes, vehicles, and jewelry). Exemplary embodiments may thus record each subsequent or successive payment 40 to the blockchain 30. That is, each payment 40 may be another transaction 26 recorded to still another block 28 of data in the blockchain 30. The block 28 of data may again record any electronic transactional data 32 and/or the electronic debt information 36 associated with the payment 40, such as the debtor, the date, the payment, timeliness, fees/interest/balance, and remaining payments. The blockchain 30 may also record the final payment 40 that extinguishes or satisfies the debt 38, along with its corresponding date and location. Similarly, if a debt is incurred for the service 34, exemplary embodiments may record the corresponding electronic transactional data 32 and/or the electronic debt information 36 to the block 28 of data in the blockchain 30. The blockchain 30 thus creates a distributed, immutable ledger that provides evidentiary documentation of each payment 40 and a final satisfaction of the debt 38.

Figure 5:
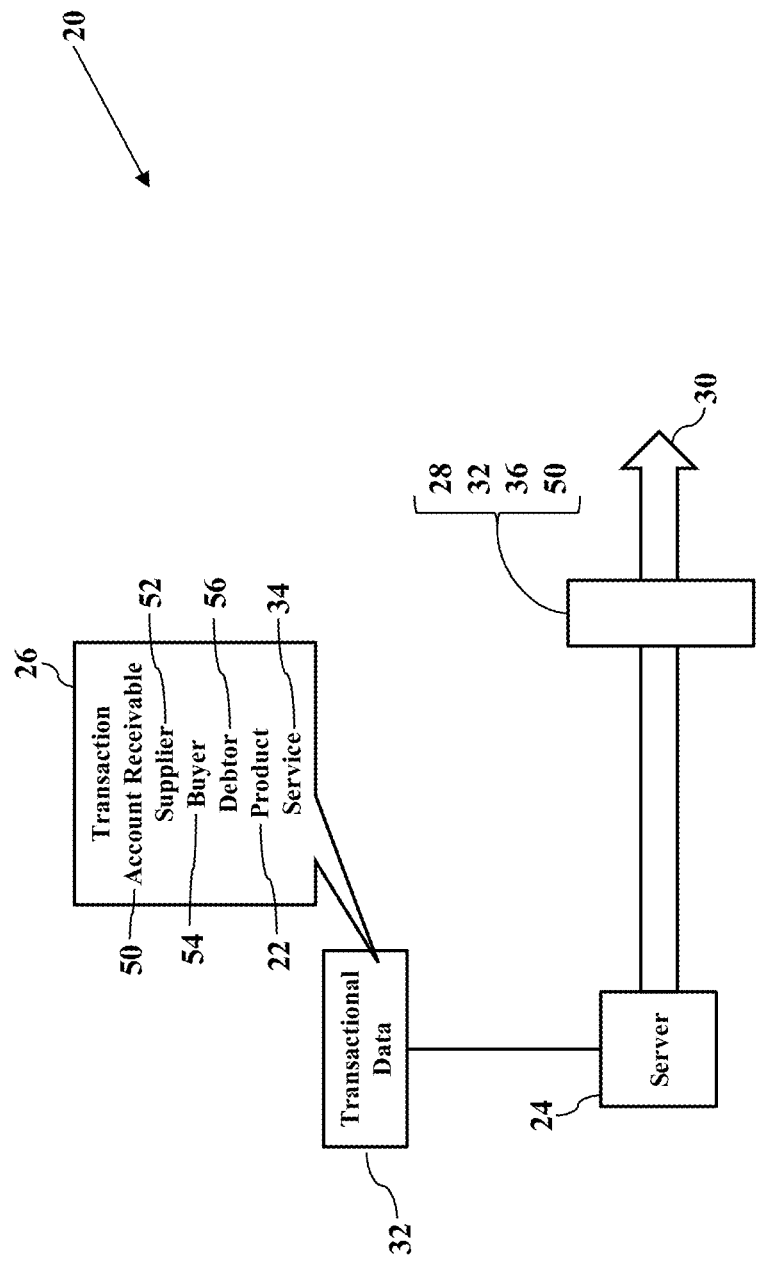

FIG. 5 illustrates accounts receivables 50. Here the blockchain 30 may also register accounts receivables 50 and other monies owed between parties. As the reader may understand, the accounts receivables 50 are common accounting practices, especially in supplier/vendor relationships. When a supplier 52 sells its product 22 or service 34 to a buyer 54, delivery may be immediate or relatively soon. Payment, though, may be delayed 45-90 days after invoicing. As a simple example, suppose the WALMART® corporation purchases thousands of the product 22 from the supplier 52. The supplier 52 submits the products 22 into Walmart's distribution system, the supplier 52 invoices WALMART® for the products 22, and the supplier 52 may then wait 45-90 days for payment. Exemplary embodiments may thus also record the account receivable 50 to the blockchain 30. The block 28 of data, for example, may also record the electronic transactional data 32 describing the account receivable 50, such as the buyer 54 (or debtor 56) and the supplier 52, the date of the account receivable 50, and the payment terms. Simply put, exemplary embodiments may fully describe and record the account receivable 50 to the blockchain 30. The blockchain 30 thus creates a distributed, immutable ledger that provides evidentiary documentation of the account receivable 50.

Figure 6:
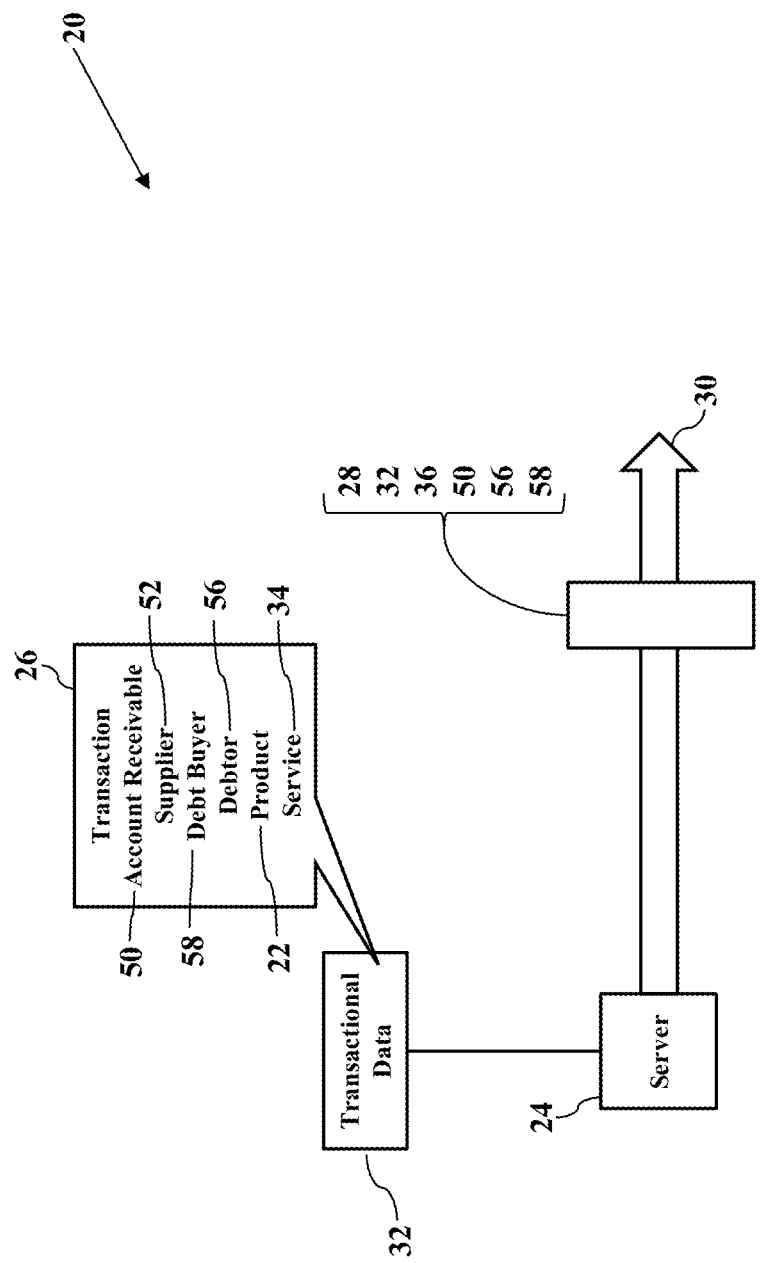

FIG. 6 illustrates subsequent sales of the account receivable 50. Even though the supplier 52 may have accepted the account receivable 50, the supplier 52 may sell the account receivable 50 for immediate cash. The supplier 52, alternatively, may offer the account receivable 50 as collateral/credit for a loan. Regardless, the account receivable 50 may be transferred or sold to a different party (such as a debt buyer or debt purchaser 58). Exemplary embodiments may thus also record subsequent transfers or sales of the account receivable 50 to the blockchain 30. When the account receivable 50 is bought, sold, or contracted, the corresponding transaction 26 is recorded to another one of the blocks 28 of data in the blockchain 30. The block 28 of data records the electronic transactional data 32, such as the buyer/seller, date, purchase/sale amount, and even location (such as GPS coordinates).

Figure 7:
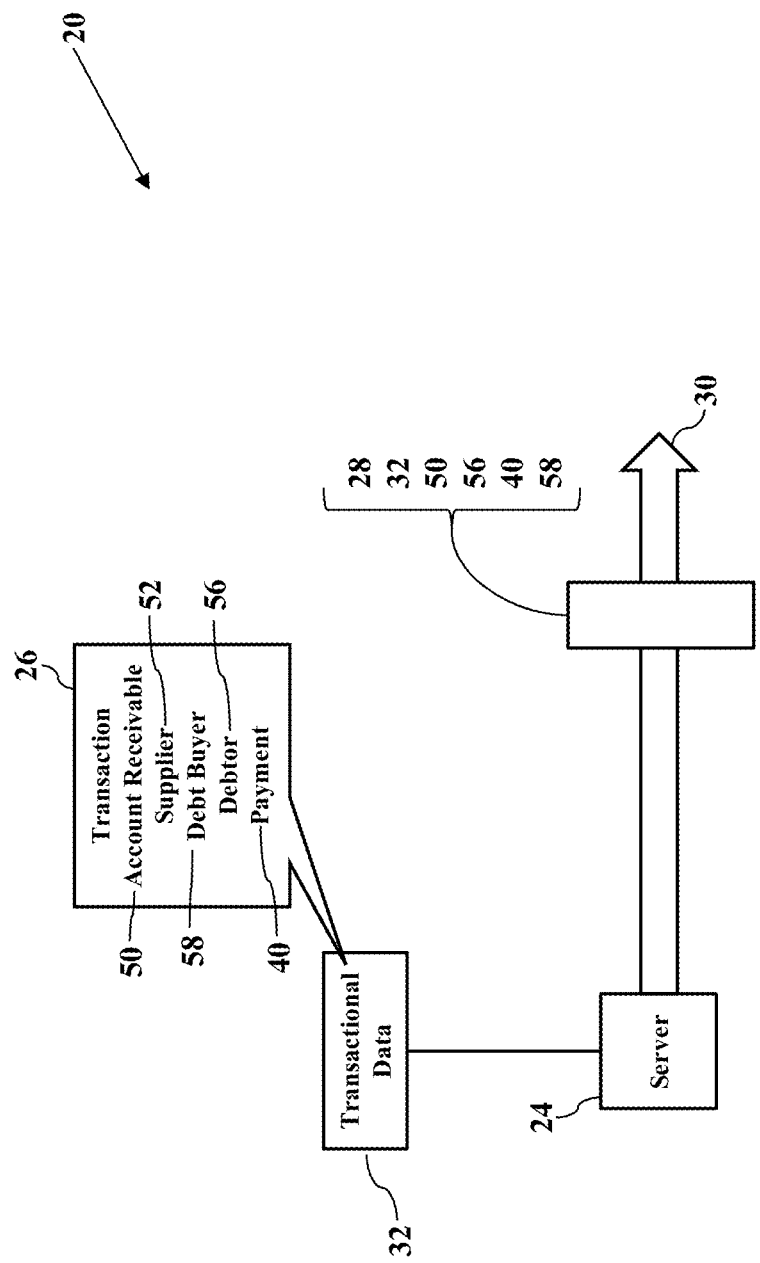

FIG. 7 illustrates payment of the account receivable 50. When the account receivable 50 is partially or fully paid, exemplary embodiments may update the blockchain 30. Any payment 40 may be registered/recorded to the blockchain 30, along with its corresponding electronic transactional data 32. The final satisfaction of the account receivable 50 may also be recorded to the blockchain 30, along with its corresponding date and location. The blockchain 30 thus creates a distributed, immutable ledger that provides evidentiary documentation of each payment 40 and final satisfaction of the account receivable 50.

Figure 8:
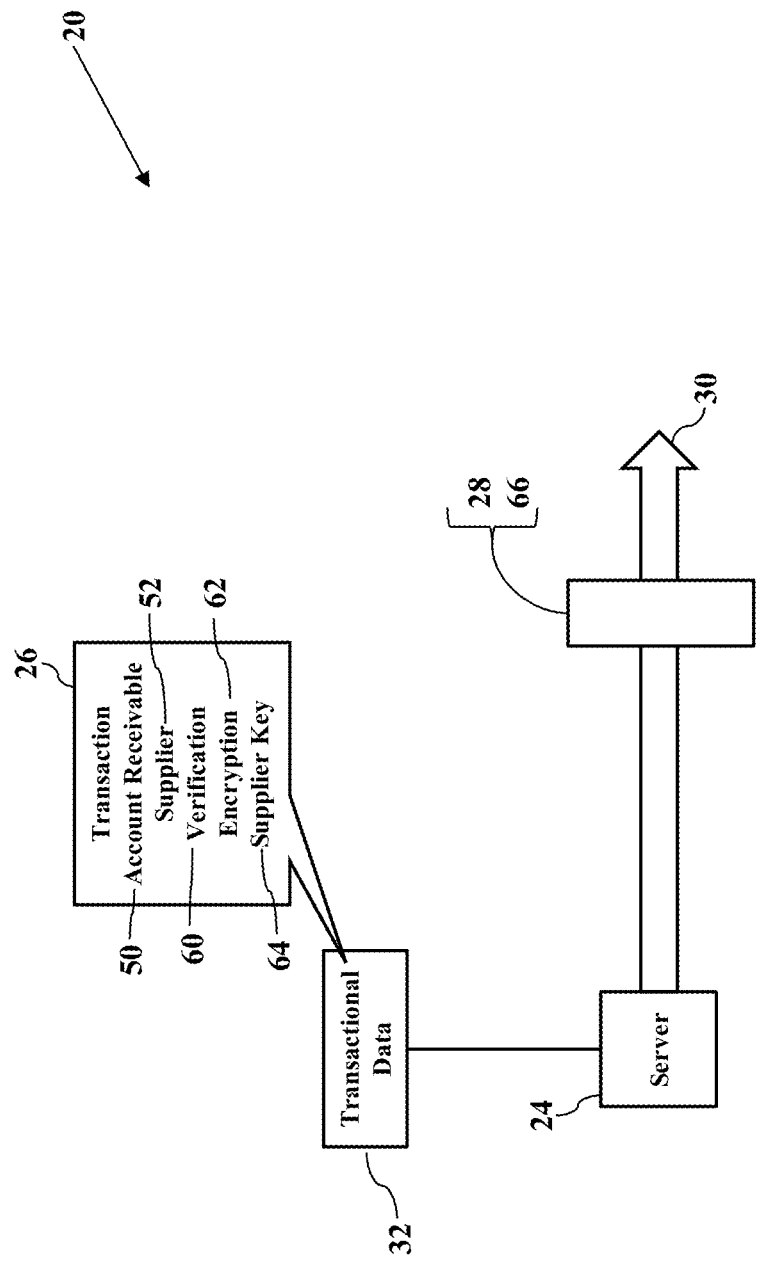

FIG. 8 illustrates verification of the account receivable 50. Even though the account receivable 50 may be registered on the blockchain 30, exemplary embodiments may include a verification 60 that the account receivable 50 is legitimate and accurate. FIG. 8, for example, illustrates an encryption 62 of the electronic transactional data 32 describing the account receivable 50. While any encryption scheme may be used, the electronic transactional data 32 may be encrypted using a cryptographic key 64 that is unique to the supplier 52. That is, perhaps only the supplier 52 knows of its unique or private supplier cryptographic key 64. The supplier 52 may thus cryptographically sign the account receivable 50 and record an encrypted account receivable 66 to the blockchain 30. Because the account receivable 50 is encrypted using the supplier's or vendor's cryptographic key 64, the supplier/vendor immediately verifies that the encrypted account receivable 66 is legitimate and accurate. Any account receivables 50 recorded to the blockchain 30 that are not encrypted with the supplier's cryptographic key 64 could be fraudulent.

Figure 9:
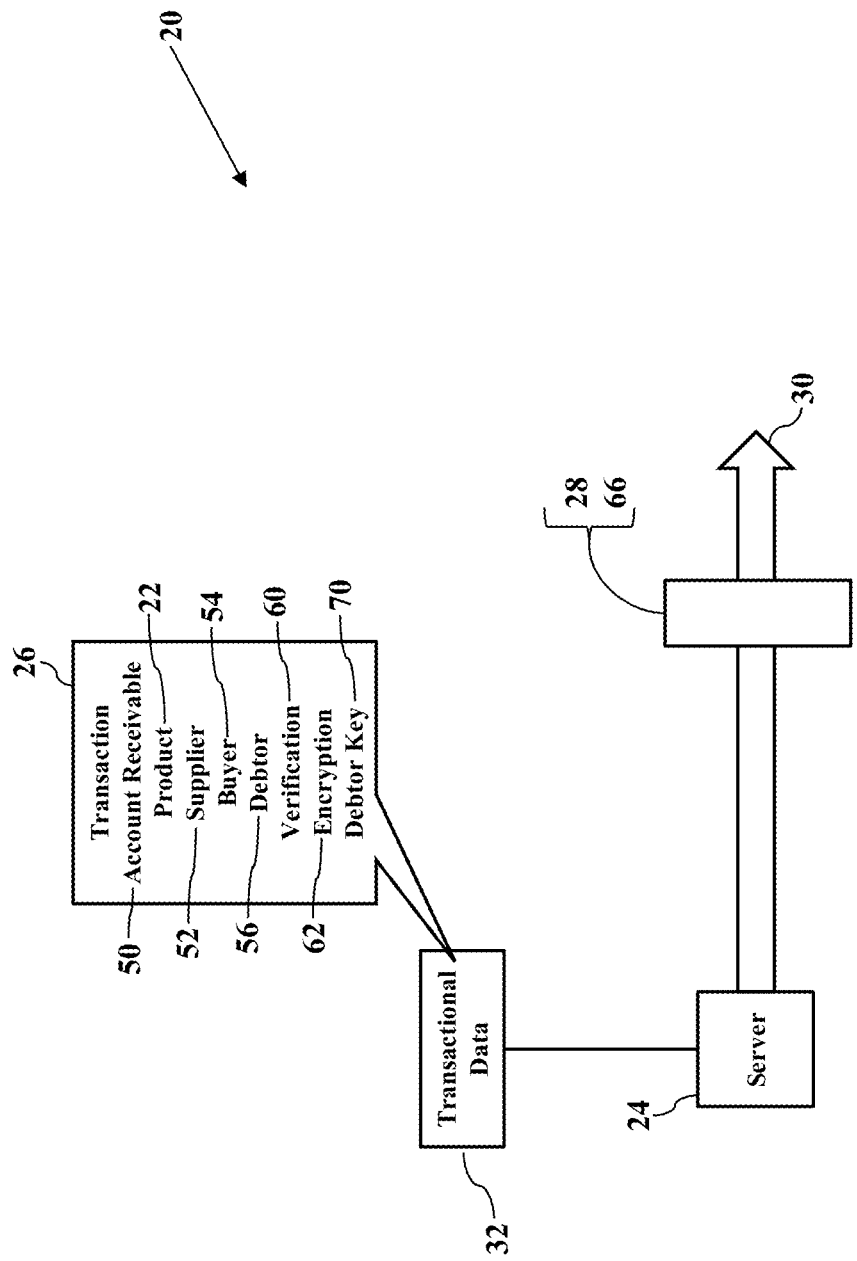

FIG. 9 illustrates another verification of the account receivable 50. Here the buyer 54 or debtor 56 associated with the account receivable 50 may include its verification 60 that the account receivable 50 is legitimate and accurate. Suppose again that WALMART® buys thousands of the product 22 from the supplier 52. When the supplier 52 invoices WALMART® for the products 22 and accepts the account receivable 50, WALMART® may self-certify that the account receivable 50 is legitimate and accurate. For example, the buyer 54 or debtor 56 associated with the account receivable 50 may encrypt the electronic transactional data 32 describing the account receivable 50 using a unique or private debtor's cryptographic key 70. The buyer 54 may thus cryptically sign the account receivable 50 and record the encrypted account receivable 66 to the blockchain 30, thus self-verifying its legitimacy and accuracy. Any account receivables 50 recorded to the blockchain 30 that are claimed to be owed by WALMART®, but not encrypted with the Walmart's cryptographic key 70, could be fraudulent.

Figure 10:
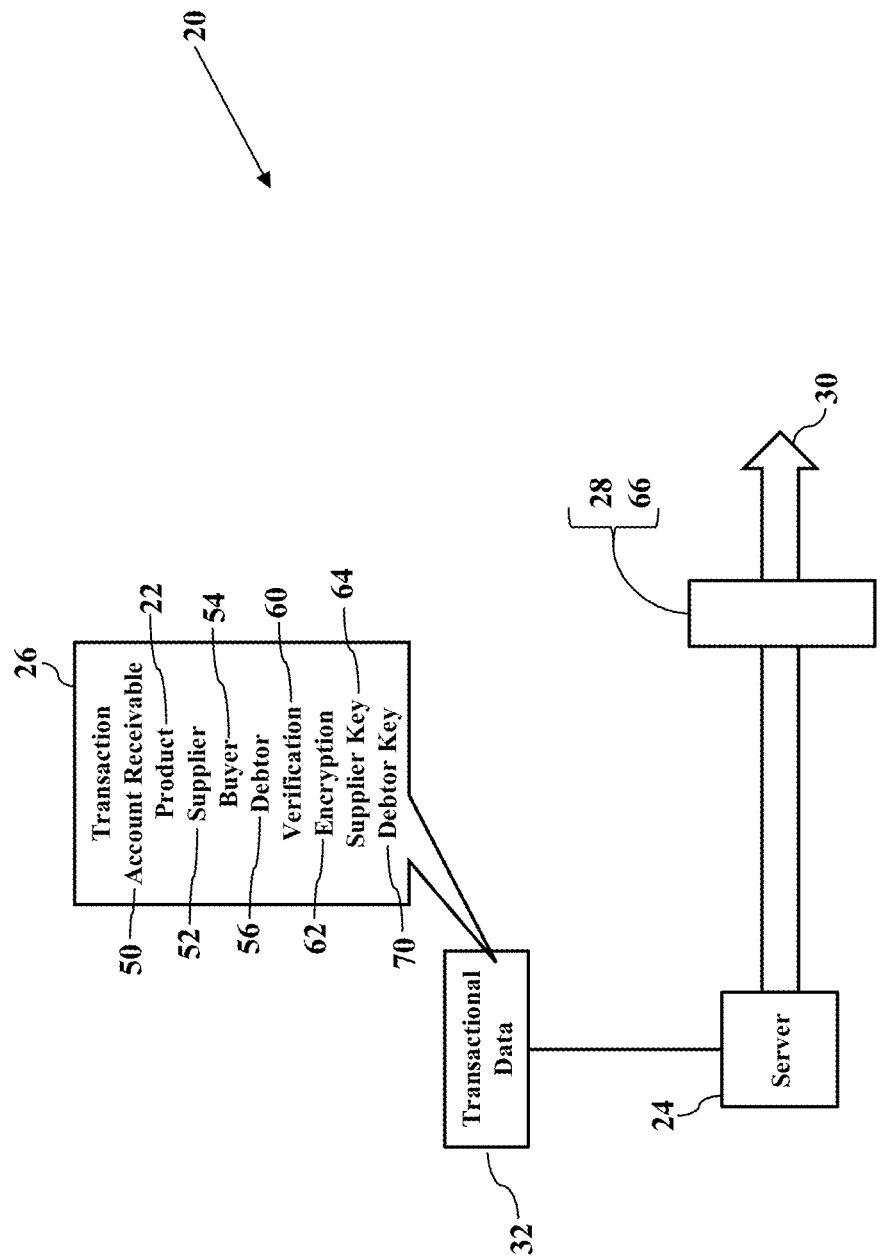

FIG. 10 illustrates still another verification of the account receivable 50. Here both the debtor 56 and the supplier 52 may jointly verify that the account receivable 50 is legitimate and accurate. Exemplary embodiments may thus encrypt the electronic transactional data 32 describing the account receivable 50 with the supplier's cryptographic key 64 and the debtor's cryptographic key 70. Because both the debtor 56 and the supplier 52 may cryptically sign the account receivable 50, both the debtor 56 and the supplier 52 verify that the account receivable 50 (and/or its corresponding encrypted account receivable 66) is legitimate and accurate. Again, then, any account receivables 50 recorded to the blockchain 30 that are claimed to be owed to the supplier 52 by the debtor 56, but not encrypted with supplier's cryptographic key 64 and the debtor's cryptographic key 70, could be fraudulent.

Figure 11:
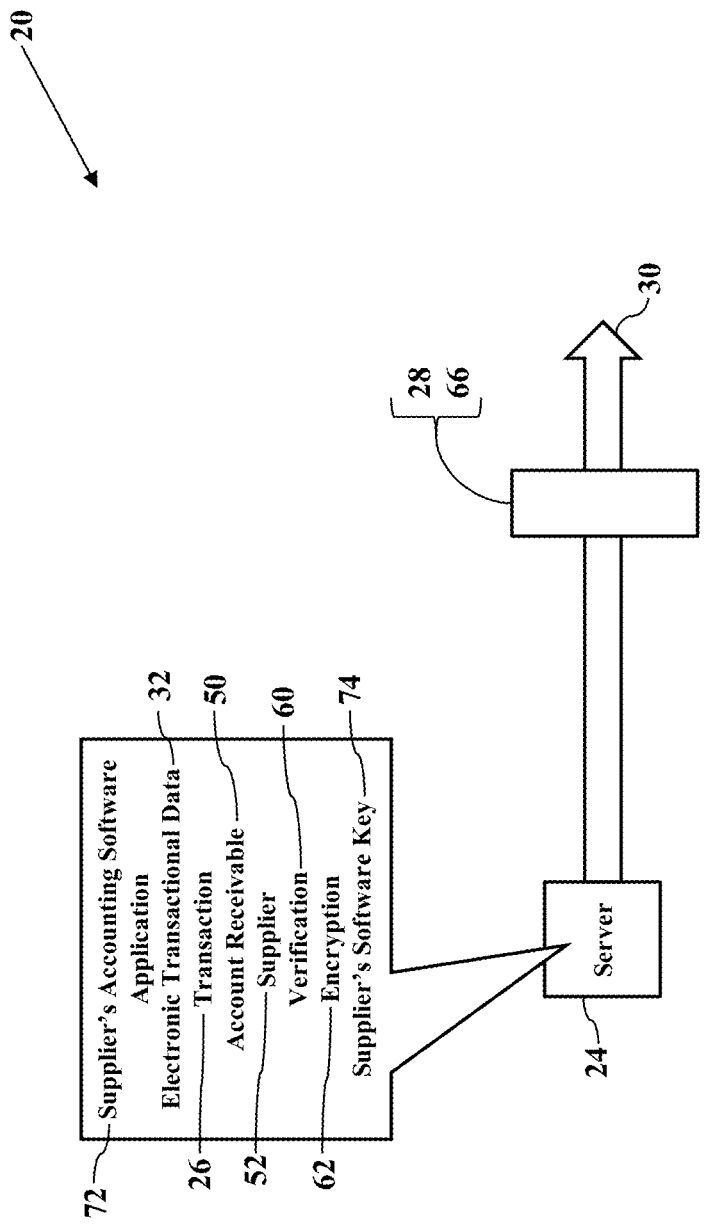

FIG. 11 illustrates accounting verification. Here exemplary embodiments may describe the supplier's accounting system that generates the account receivable 50. Suppose, for example, that the server 24 operates on behalf of the supplier 52, and the server 24 stores and executes the supplier's accounting software application 72. The server 24 executes the supplier's accounting software application 72 to generate the electronic transactional data 32 describing the transaction 26 and the account receivable 50. Here, though, the electronic transactional data 32 may also include any data or information describing the supplier's accounting software application 72. FIG. 11, for example, illustrates a public and/or private software cryptographic key 74 that is unique to the supplier's accounting software application 72. The supplier's accounting software application 72 may thus cryptographically sign the account receivable 50 and record its corresponding encrypted account receivable 66 to the blockchain 30. Because the electronic transactional data 32 describing the account receivable 50 may be encrypted using the software cryptographic key 74 that is unique to the supplier's accounting software application 72, the supplier 52 and/or the supplier's accounting software application 72 may also verify that the account receivable 50 is legitimate and accurate. Any account receivables 50 recorded to the blockchain 30 that are claimed to be owed to the supplier 52, but not encrypted with supplier's software cryptographic key 74, could be fraudulent.

Cryptographic credentials provide the verification 60. Not only may the account receivable 50 be registered to the blockchain 30, but the blockchain 30 may also detail information about the supplier's accounting software application 72 in a cryptographic way, such that the information may be checked using the same cryptographic credentials. Any third party that wishes to verify the account receivable 50 (such as an interested or bidding debt buyer or debt purchaser) may inspect the blockchain 30 and check a status of the account receivable 50. Again, then, the blockchain 30 creates a distributed, immutable ledger that provides evidentiary documentation of the account receivable 50 generated by the supplier's accounting software application 72.

Figure 12:
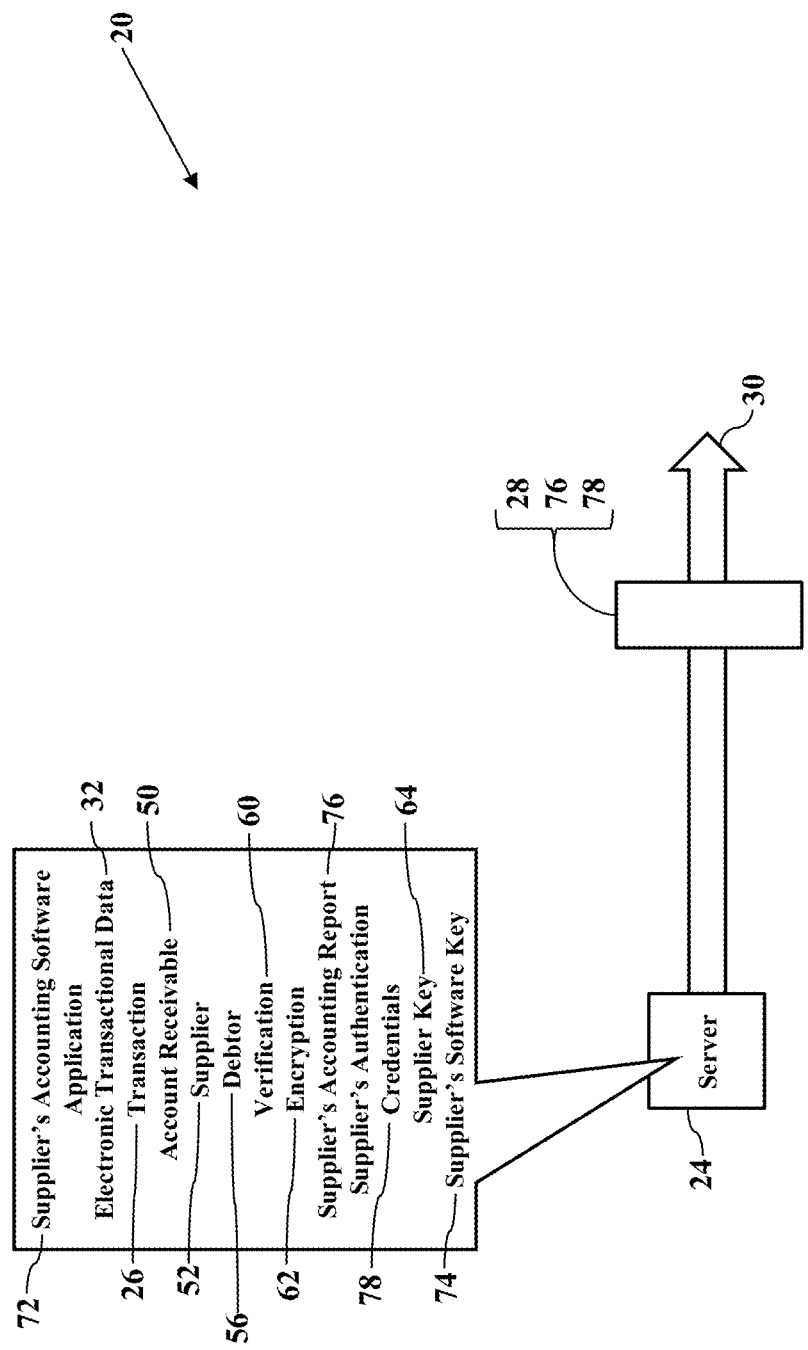

FIG. 12 illustrates the supplier's accounting report 76. As the reader may understand, the supplier's accounting software application 72 may generate the supplier's accounting report 76 that describes the transaction 26, including the account receivable 50. Here, though, the supplier's accounting software application 72 may also generate one or more supplier's authentication credentials 78. The supplier's authentication credentials 78 may be unique to the supplier's accounting report 76. When the transaction 26 is written to the blockchain 30, exemplary embodiments may also record the supplier's accounting report 76 to the block 28 of data in the blockchain 30. The supplier's accounting report 76 may again describe the debtor 56, the supplier 52, the date of the account receivable 50, the payment terms, and any other relevant or desired data. However, exemplary embodiments may additionally or alternatively record or register the supplier's authentication credentials 78 for accessing the supplier's accounting report 76. Moreover, exemplary embodiments may also cryptographically sign the supplier's accounting report 76 and/or the supplier's authentication credentials 78. Again, while any encryption scheme may be used, exemplary embodiments may use the supplier's cryptographic key 64 and/or the supplier's software cryptographic key 74. The supplier 52 may thus cryptographically sign the account receivable 50, the supplier's accounting report 76, and/or the supplier's authentication credentials 78 to the blockchain 30. Because the electronic transactional data 32 may be encrypted using the supplier's software cryptographic key 74, the supplier's accounting software application 72 verifies that the account receivable 50, the supplier's accounting report 76, and/or the supplier's authentication credentials 78 is/are legitimate and accurate. Any entries in the blockchain 30 not encrypted with the supplier's software cryptographic key 74 could be unverified and/or fraudulent.

Figure 13:
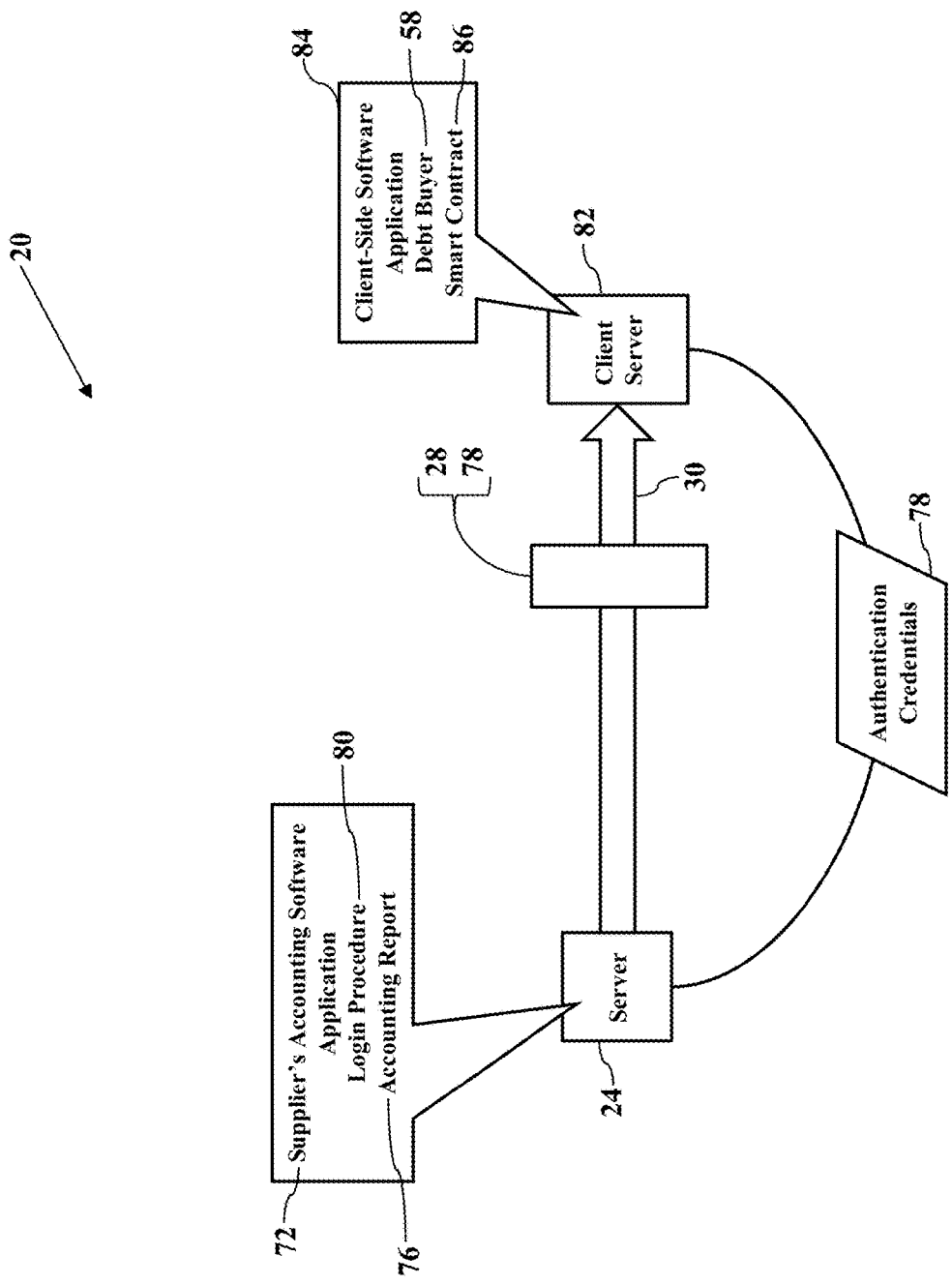

FIG. 13 illustrates permissioned access. As the reader likely understands, the supplier's accounting software application 72 may have a login procedure 80. Because the authentication credentials 78 may be registered in the block 28 of data in the blockchain 30, any interested party may inspect the block 28 of data and identify and retrieve the authentication credentials 78 (e.g., username, password, two-factor system, and/or biometric file). Those authentication credentials 78 may then be submitted to the login procedure 80 to the supplier's accounting software application 72. If the authentication credentials 78 are successful, then the user may have access to the to the supplier's accounting report 76. Suppose, for example, that the blockchain 30 is received as an input by a client server 82. The client server 82 may be operated on behalf of any third-party that receives or subscribes to the blockchain 30 as a client. While the third party may be any public or private entity, the third party may be the potential debt buyer 58 who is conducting due diligence before purchasing the account receivable 50. The client server 82 executes a client-side software application 84 that instructs the client server 82 to receive the blockchain 30, read the block 28 of data, and obtain the authentication credentials 78. As a simple example, the client-side software application 84 may be a component or module of a digital or smart contract 86 that is capable of reading the blockchain 30. Once the client server 82 retrieves the authentication credentials 78, the client-side software application 84 instructs the client server 82 to submit the authentication credentials 78 to the login procedure 80 to the supplier's accounting software application 72. Because the supplier's authentication credentials 78 were generated by the supplier's accounting software application 72, the authentication credentials 78 should successfully authenticate.

Permissioned access, though, may be limited. Because the supplier's authentication credentials 78 may be specific to the supplier's accounting report 76, the accessing user (such as the client server 82) may be limited to accessing only the supplier's accounting report 76. The supplier's authentication credentials 78, in other words, may self-select and/or be associated with an access permission and/or a role that allows strictly limits access and retrieval of only the supplier's accounting report 76. The user may thus only have permission to access data or information associated with the supplier's accounting report 76 (e.g., the electronic transactional data 32 describing the transaction 26 that logs the account receivable 50, as explained with reference to FIG. 12). In other words, the supplier's accounting report 76 may only be as detailed as the authentication credentials 78 permit. Other data, such as different transactions or different accounting reports, may be inaccessible and unauthorized.

Figure 14:
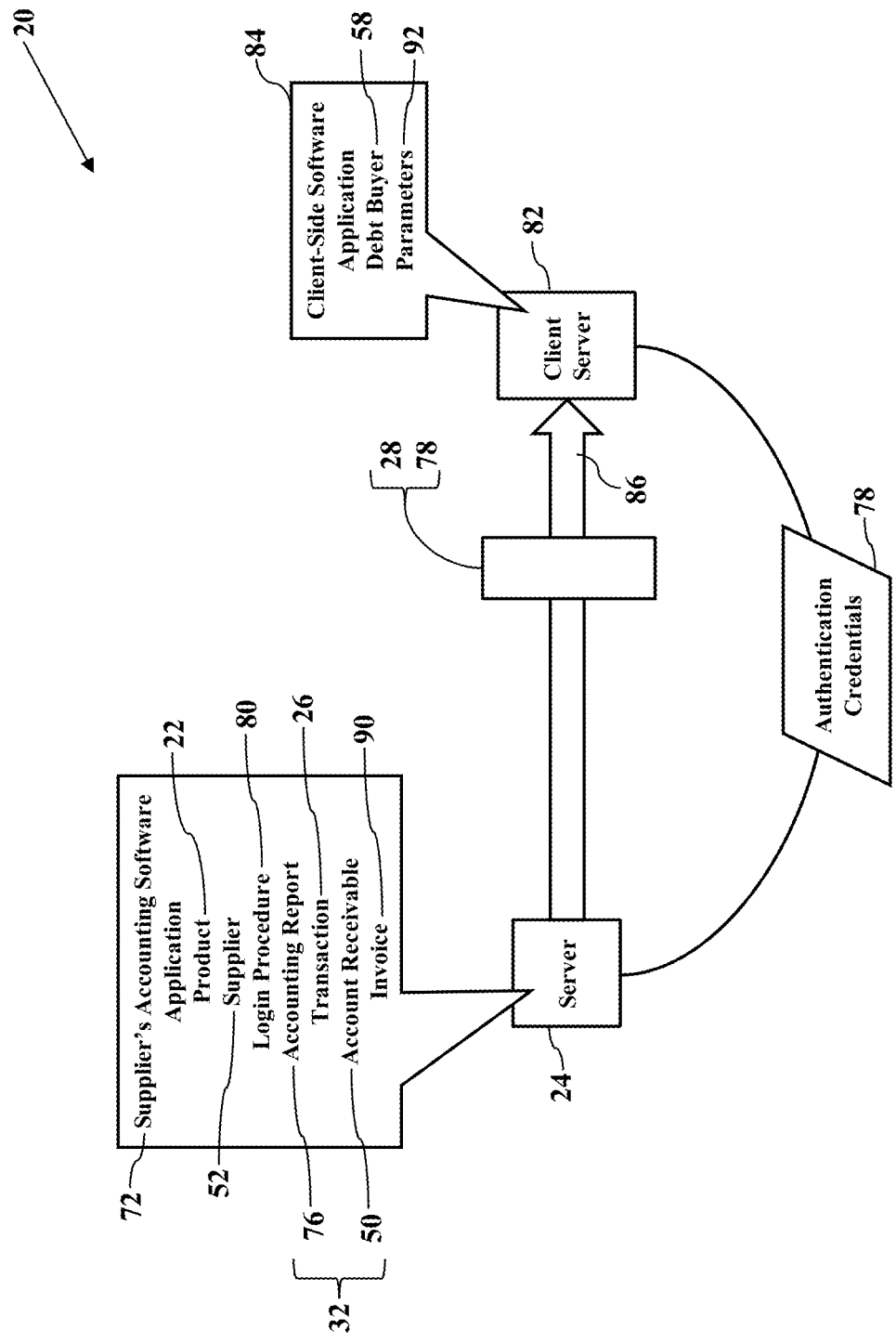

FIG. 14 illustrates an example that helps explains the supplier's accounting report 76. Suppose again that WALMART® contracts with the supplier 52 to purchase the product 22. The supplier's server 24 executes the supplier's accounting software application 72, autogenerates an invoice 90, enters or logs the account receivable 50, and generates the supplier's accounting report 76. The supplier's server 24 then registers the transaction 26 (e.g., the account receivable 50) to the block 28 of data within the blockchain 30. The account receivable 50 and/or the block 28 of data may also be cryptographically signed (as above explained). The client server 82 may then receive the blockchain 30 and read the block 28 of data. The client server 82, in other words, may be programmed to receive and inspect the blockchain 30 for the block 28 of data detailing the account receivable 50. If the account receivable 50 satisfies one or more decision parameters 92, then the debt buyer 56 may bid on or even buy the account receivable 50. Indeed, the digital or smart contract 86 may execute on the blockchain 30 to automate the bidding and purchasing process. The client server 82 and/or the smart contract 86 may decrypt the transaction 26 (e.g., the account receivable 50), read the supplier's authentication credentials 78, log in to the supplier's accounting software application 72, and access the supplier's accounting report 76.

The buyer may inspect the supplier's accounting report 76. If the supplier's authentication credentials 78 only grant permission access to the supplier's accounting report 76, the buyer's server 24 may only access the electronic transactional data 32 describing the transaction 26 and the account receivable 50. Suppose the supplier's invoice 90 is numbered "32968" and details a debt or amount owed by WALMART® to the supplier 52. The potential debt buyer 56 may use the supplier's authentication credentials 78 written into the transaction 26 to access the supplier's accounting report 76 and/or its associated invoice 90. The potential debt buyer 58 may thus confirm or verify the existence of the account receivable 50 by reading/retrieving the supplier's accounting report 76 detailing the supplier's invoice 90 "32968." Exemplary embodiments may thus be analogized to a patient's medical records. The patient may authorize a physician to only access a particular medical record. The patient, in other words, may establish access credentials that only permit or specify the particular medical record. The supplier's authentication credentials 78 written into the blockchain 30 may thus be a "front door" to only the transaction 26, the supplier's accounting report 76, and/or its associated invoice 90.

Exemplary embodiments thus reduce fraud and transaction costs. Conventional debt markets are subject to fraudulent sales of accounts receivables and other debt. Debt sales are conducted without accurate verification of the existence and/or terms of the debt. Fraud increases the risk on brokers and agents, which increases the transactional costs in debt sales. Exemplary embodiments, instead, solve the problem of fraud in secondary market transactions for debt. Because the buyer of the debt 38 is now given access to the actual supplier's accounting report 76, the buyer may quickly and simply verify existence of the account receivable 50. The verification 60 will reduce the transactional costs and interest rates. The corollary is that if the supplier 52 denies access to the supplier's accounting report 76, potential buyers will assume a greater risk exists and interest rates will increase. Exemplary embodiments thus implement a market mechanism that holds accountable and the blockchain 30 records and proves any attempted reads and any attempted writes.

Figure 15:
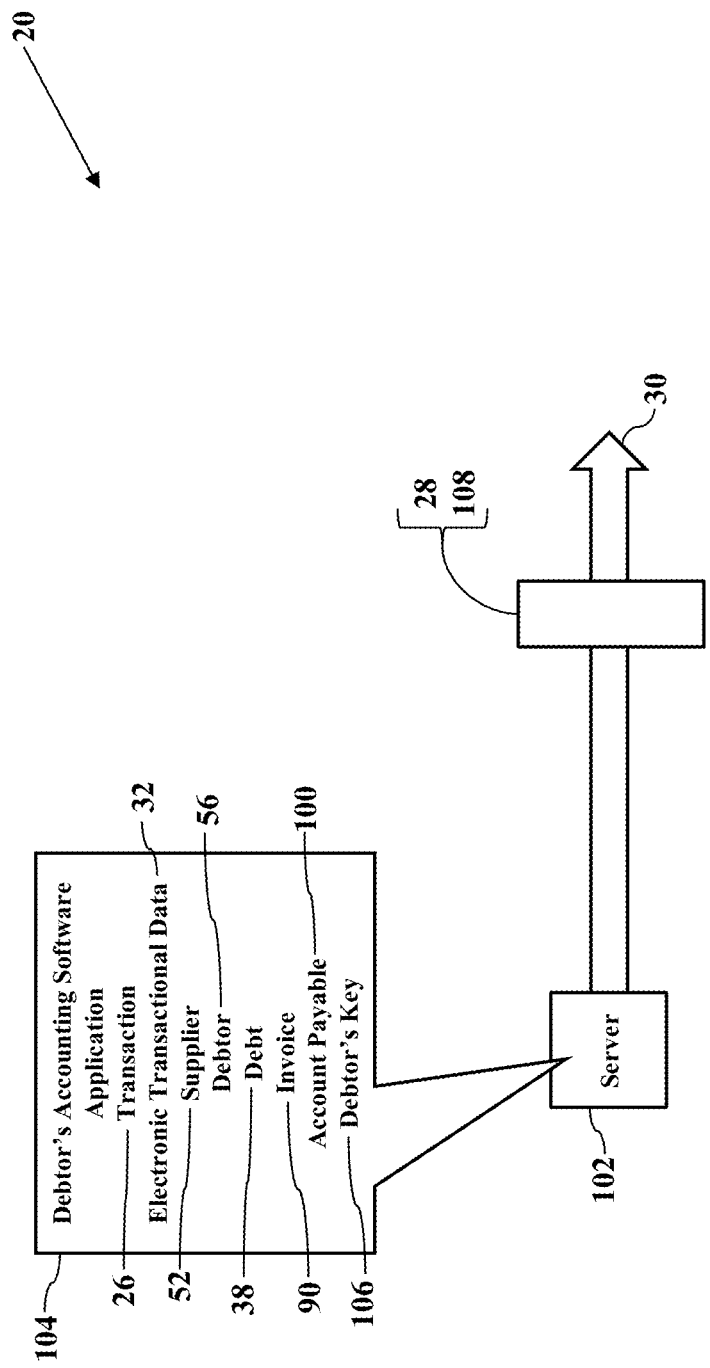

FIG. 15 illustrates a debtor's account payable 100. As the reader may understand, when the debtor 56 defers a payment to the supplier 52, the debtor 56 incurs the account payable 100. Suppose again that WALMART® contracts with the supplier 52 as the debtor 56 and owes the debt 38, perhaps as described or specified by the invoice 90. WALMART® thus has a debtor's accounting system that logs or enters the invoice 90 as the account payable 100. FIG. 15 illustrates Walmart's accounting system as a debtor's server 102 that stores the debtor's accounting software application 104. The debtor's server 102 executes the debtor's accounting software application 104 to generate the electronic transactional data 32 describing the transaction 26 and the debtor's account payable 100. The electronic transactional data 32, however, may also include any data or information describing the debtor's accounting software application 104, such as another unique public and/or private debtor's cryptographic key 106 that is unique to the debtor 56 and/or the debtor's accounting software application 104. The debtor's accounting software application 104 may thus cryptographically sign the account payable 100 and record an encrypted account payable 108 to the blockchain 30. Because the account payable 100 may be encrypted using Walmart's unique/private cryptographic key 106, WALMART® and/or its debtor's accounting software application 104 verifies that the account payable 100 is legitimate and accurate. Any entries in the blockchain 30 not encrypted with Walmart's unique/private cryptographic key 106 could be unverified and/or fraudulent.

Figure 16:
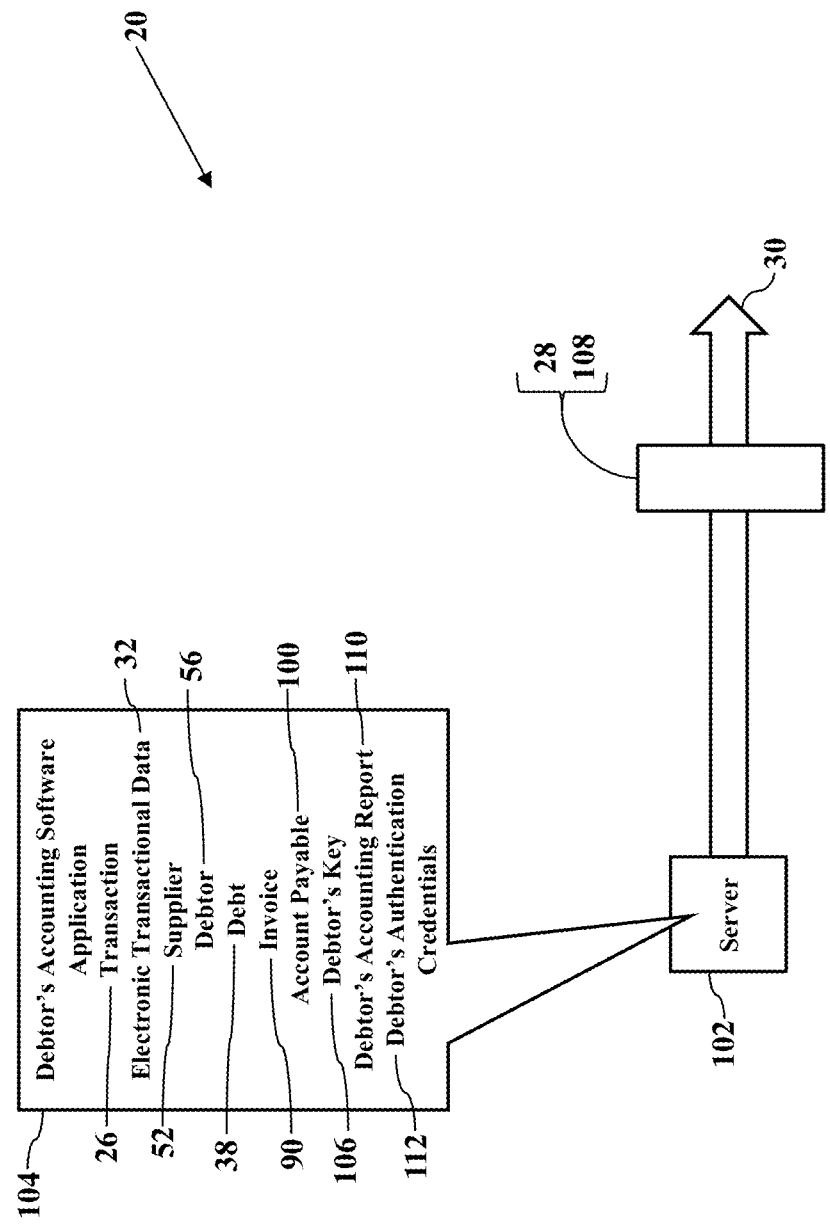

FIG. 16 illustrates a debtor's accounting report 110. Here the debtor's accounting software application 104 may generate the debtor's accounting report 110 that describes the transaction 26 and the account payable 100. The debtor's accounting software application 104 may also generate one or more debtor's authentication credentials 112 that are unique to the debtor's accounting report 110. When the transaction 26 is written to the blockchain 30, exemplary embodiments may also record the debtor's accounting report 110 to the block 28 of data in the blockchain 30 (e.g., the debtor/buyer 54, the supplier 52, the date of the account payable 100, the payment terms, and any other relevant or desired data). However, exemplary embodiments may additionally or alternatively record or register the debtor's authentication credentials 112 for accessing the debtor's accounting report 110. Moreover, exemplary embodiments may also cryptographically sign the debtor's accounting report 110 and/or the debtor's authentication credentials 112. Again, while any encryption scheme may be used, exemplary embodiments may use the debtor's cryptographic key 106 that uniquely identifies the debtor 56 and/or the debtor's accounting software application 104. The account payable 100, the debtor's accounting report 110, and/or the debtor's authentication credentials 112 may be cryptographically signed to the blockchain 30. The debtor 56 and/or the debtor's accounting software application 104 may thus verify that the account payable 100, the debtor's accounting report 110, and/or the debtor's authentication credentials 112 is/are legitimate and accurate. Any entries in the blockchain 30 not encrypted with the debtor's cryptographic key 106 could be unverified and/or fraudulent.

Figure 17:
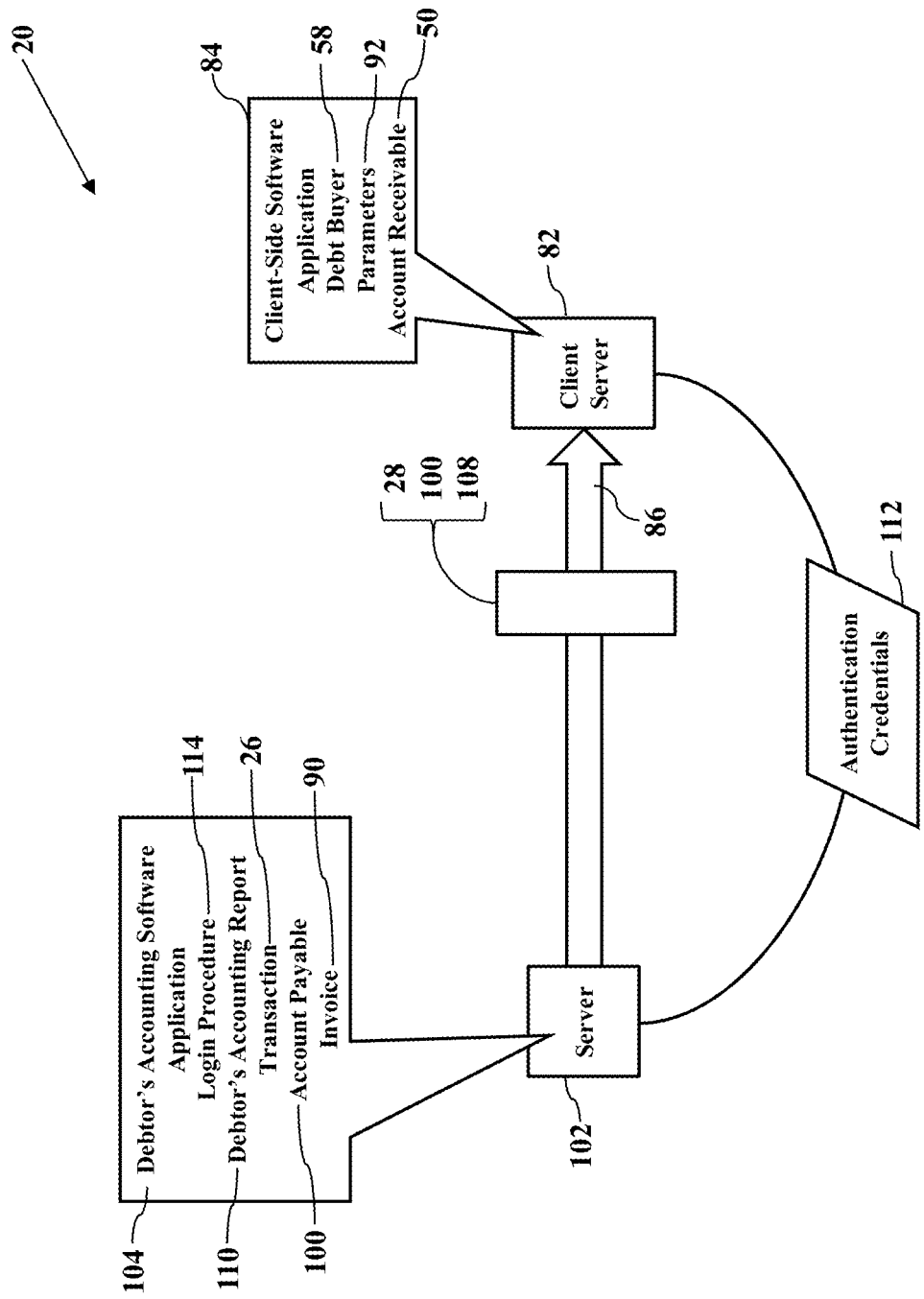

FIG. 17 illustrates how accounting cryptology again preserves permissioned access. As the reader likely understands, the debtor's accounting software application 104 may also have a debtor's login procedure 114. The client server 82 receives the blockchain 30, reads the block 28 of data, obtains the data or information associated with the account payable 100 and/or its the encrypted version 108. If the account payable 100 satisfies the decision parameters 92, then the debt buyer 58 may have sufficient confidence that the corresponding account receivable 50 is authenticate and/or correct. Indeed, the digital or smart contract 86 may execute on the blockchain 30 to automate the bidding and purchasing process. The client server 82 and/or the smart contract 86 may decrypt the transaction 26 (e.g., the account receivable 50), read the debtor's authentication credentials 112, log in to the debtor's accounting software application 104, and access the debtor's accounting report 110. Again, then, the debtor's authentication credentials 112 may limit access to only the debtor's accounting report 110. The debtor's authentication credentials 112, in other words, may self-select and/or be associated with an access permission and/or a role that strictly limits access and retrieval of only the debtor's accounting report 110. Other data, such as different transactions or different accounting reports, may be inaccessible and unauthorized.

Debt buyers may access the debtor's accounting report 110. When the debtor's server 102 registers the account payable 100 to the block 28 of data within the blockchain 30, potential debt buyers may receive the blockchain 30 and read the block 28 of data. The potential buyer's client server 82, in other words, may be programmed to receive and inspect the blockchain 30 for the block 28 of data detailing the account payable 100. If the account payable 100 satisfies the one or more decision parameters 92, then the debt buyer 56 may bid on or even buy the corresponding account receivable 50. Again, the digital or smart contract 86 may execute on the blockchain 30 to automate the bidding and purchasing process. The client server 82 and/or the smart contract 86 may decrypt the transaction 26 (e.g., the account receivable 50 and/or the account payable 100), read the debtor's authentication credentials 112, log in to the debtor's accounting software application 104, and access the debtor's accounting report 110.

The buyer may inspect the debtor's accounting report 110. If the debtor's authentication credentials 112 only grant permission access to the debtor's accounting report 110, the client server 82 and/or the smart contract 86 may only access the electronic transactional data 32 describing the transaction 26 and the account payable 100. The potential debt buyer 58 may use the debtor's authentication credentials 112 written into the transaction 26 to access the debtor's accounting report 110 and/or its associated invoice 90. The potential debt buyer 58 may thus confirm or verify the existence of the account payable 100 and/or the corresponding account receivable 50 by reading/retrieving the debtor's accounting report 110 detailing the supplier's invoice 90. The debtor's authentication credentials 112 written into the blockchain 30 may thus be a "front door" to only the transaction 26, the debtor's accounting report 110, and/or its associated invoice 90.

Fraud and costs are again reduced. The potential debt buyer 58 (e.g., the client server 82 and/or the digital or smart contract 86 executed on the blockchain 30) may access both the debtor's accounting report 110 and the supplier's accounting report 76 (as explained with reference to FIGS. 11-13). The client server 82 and/or the digital or smart contract 86 may be programmed to compare the supplier's transactional data 32 to the debtor's transactional data 32. Simply put, if the data describing the account receivable 50 matches, nearly matches, or sufficiently coincides with the data describing the account payable 100, then the potential debt buyer 58 may have confidence to bid/buy. The account receivable 50 is verified. However, if the account receivable 50 fails to sufficiently match or satisfy the account payable 100, fraud may be present. A difference or discrepancy in risk, costs, and/or interest rates may thus indicate potential fraud and require greater human or machine scrutiny. Exemplary embodiments thus allow buyers of debt and other financial instruments to inspect each party's accounting records using a blockchain environment.

Payments may also be verified. The above paragraphs explained how the payment 40 of the account receivable 50 may be recorded to the blockchain 30 for inspection. Exemplary embodiments, then, may allow both the debtor 56 and the supplier 52 to record any payment 40. For example, when the debtor 56 (again, such as WALMART®) makes a partial or full payment of the account receivable 50 and/or the account payable 100, the debtor's accounting software application 104 may generate another of the debtor's accounting report 110 that describes the corresponding transaction 26. Moreover, the debtor's authentication credentials 112 may also be generated and written to the blockchain 30 (as above explained). Similarly, the supplier's accounting software application 72 may generate another of the supplier's accounting reports 76 that describes the corresponding transaction 26, along with the supplier's authentication credentials 78 (as also above explained). The potential debt buyer 58 (e.g., the client server 82 and/or the digital or smart contract 86 executed on the blockchain 30) may access both the most recent debtor's accounting report 110 and the most recent supplier's accounting report 76 to verify that the debt 38 is still outstanding. If a comparison confirms that a debt balance still exists, the potential buyer 54 may bid/buy the account receivable 50. However, if the account receivable 50 has been paid or satisfied, then the server 24 and/or the digital or smart contract 86 may abandon the purchase and alert of potential fraud.

Exemplary embodiments may also allow anonymous viewing. Because the authentication credentials 78 and 112 may be published to the blockchain 30, any party may read the blockchain 30, obtain the authentication credentials 78 and 112, logon to the respective accounting software applications 72 and 104, and access the corresponding accounting reports 76 and 110. Any buyer or third party having access to the blockchain 30 may anonymously check the status of the account receivable 50 and/or the account payable 100. This viewing opportunity will greatly increase the transparency of debt obligations as compared to today's conventional debt markets. Moreover, because the blockchain 30 may be published according to a subscription or even public distribution, the blockchain 30 will be available to far more potential buyers than today's conventional debt markets. The need for middle brokers and agents, and their associated fees and costs, are greatly reduced or even eliminated. Still more advantageous, because debt verification may be automated (via the servers 24, 82, 102, and/or the smart contract 86), debt sales will be conducted in much less time with much less or little human effort. All these advantages reduce fraud and costs.

Dedicated reporting may be used. The blockchain 30 may be dedicated to accounts receivables 50 associated with the supplier 52 and/or the debtor 56. As the reader may again understand, the supplier 52 may have many accounts receivables 50 with many customers. The supplier 52, then, may wish to record any or all of the accounts receivables 50 to a single or common blockchain 30. The blockchain 30, in other words, may be dedicated to publishing the supplier's accounts receivables 50 to a pool or to subscribers of potential debt buyers. Each potential buyer that receives the blockchain 30 may inspect the accounts receivables 50 and bid, buy, or pass. Because the supplier 52 may distribute its accounts receivables 50 via the blockchain 30, the supplier 52 may reduce its costs and interest rates when offering its sales.

Figure 18:
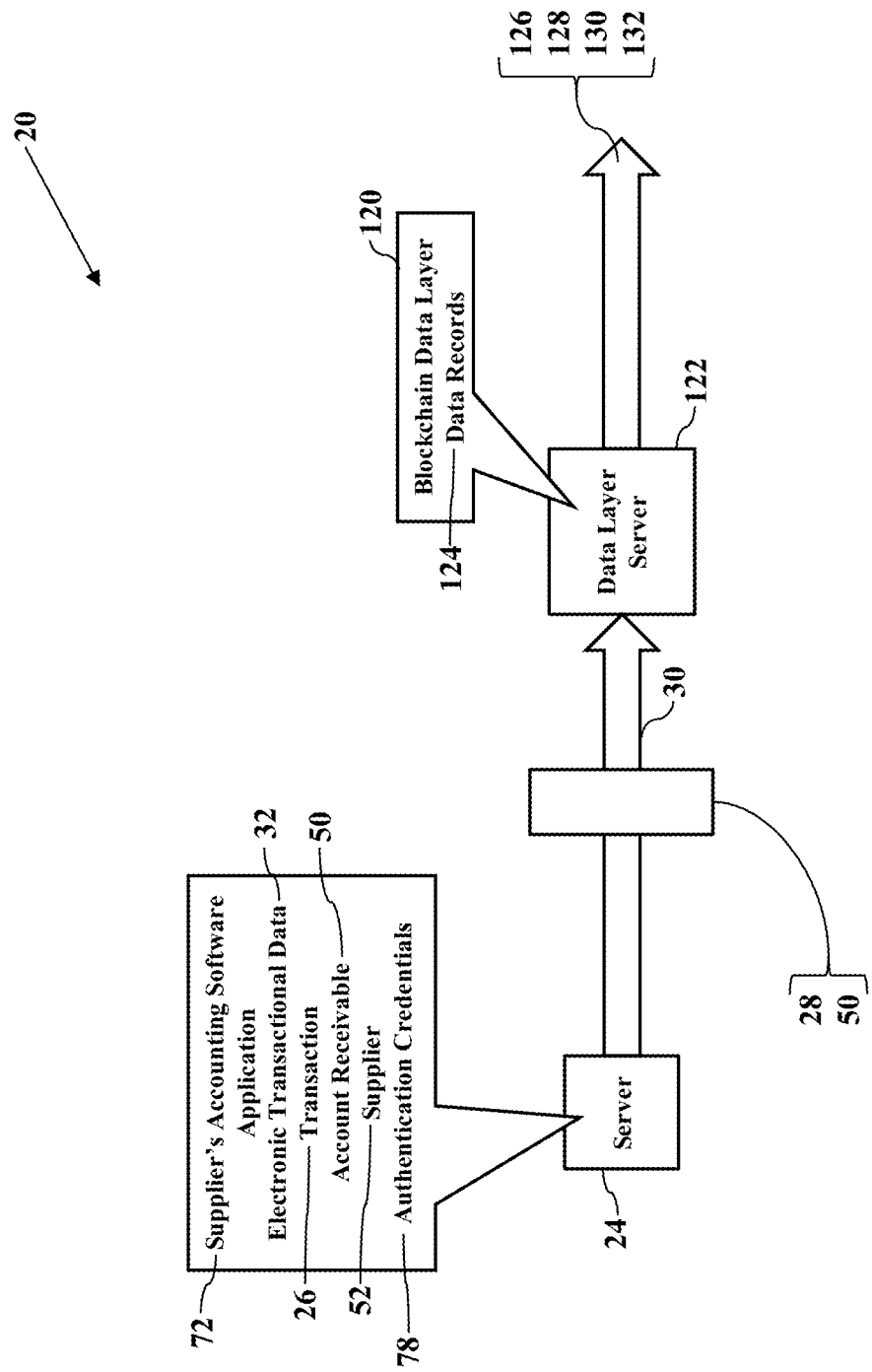

FIG. 18 illustrates a blockchain data layer 120. The blockchain data layer 120 is a mechanism that also records the account receivable 50 from the supplier 52. The blockchain data layer 120 is created by a data layer server 122 that interfaces with the supplier's server 24. When the supplier's server 24 and/or the supplier's accounting software application 72 generates the blockchain 30 documenting the account receivable 50 and/or the supplier's authentication credentials 78, the supplier's server 24 distributes or sends the blockchain 30 to the network address (e.g., Internet protocol address) associated with the data layer server 122. The data layer server 122 then generates data records 124 in the blockchain data layer 120 that also describe the account receivable 50 and/or the supplier's authentication credentials 78 (as later paragraphs will explain). Moreover, the blockchain data layer 120 may also add another layer of cryptographic hashing to generate a public blockchain 126. The blockchain data layer 120 acts as a validation service 128 that validates the account receivable 50 and/or the supplier's authentication credentials 78. Moreover, the blockchain data layer 120 may generate a cryptographic proof 130. The public blockchain 126 thus publishes the cryptographic proof 130 as a public ledger 132 that establishes chains of blocks of immutable evidence. The blockchain data layer 120 thus generates the public blockchain 126 as a public resource or utility for record keeping. Any party, entity, or device that subscribes to the blockchain data layer 120 may thus access, read, and/or store the proofs 130 of the account receivable 50 and/or the supplier's authentication credentials 78. The blockchain data layer 120, in other words, acts as the public ledger 132 that establishes chain of blocks of immutable evidence. Interested debt buyers may inspect the public blockchain 126, obtain the supplier's authentication credentials 78, retrieve the supplier's accounting report 76, and bid, buy, or pass.

Figure 19:
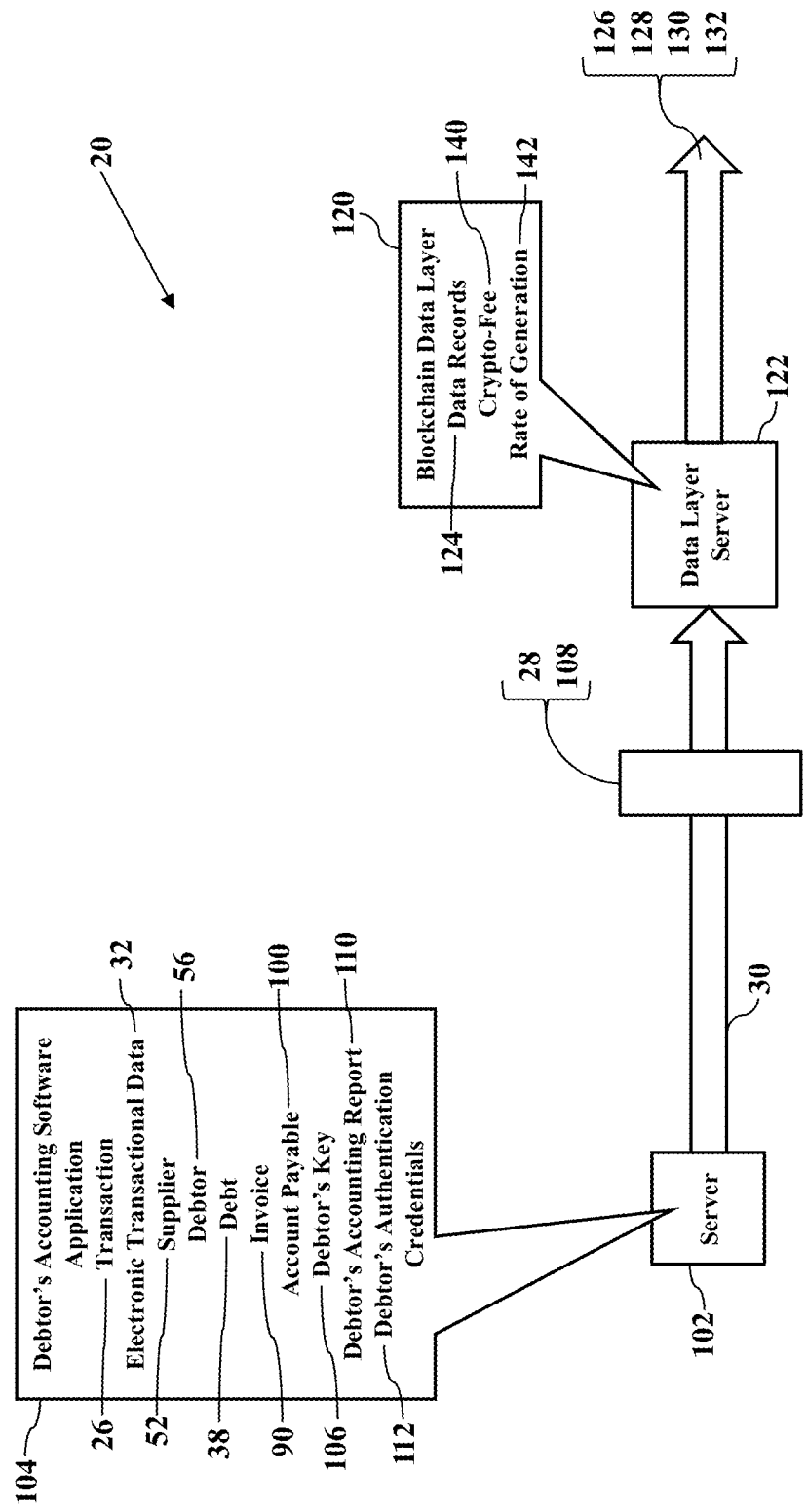

FIG. 19 illustrates proof of the account payable 100. Recall that the debtor's accounting software application 104 may generate the blockchain 30 documenting the account payable 100 and/or the debtor's authentication credentials 112. The debtor's server 102 may then distribute or send the blockchain 30 to the network address (e.g., Internet protocol address) associated with the data layer server 122. The data layer server 122 then generates the data records 124 in the blockchain data layer 120 that also describe the account payable 100 and/or the debtor's authentication credentials 112. The blockchain data layer 120 generates the public blockchain 126 as the validation service 128 that validates the account payable 100 and/or the debtor's authentication credentials 112. The public blockchain 126 also publishes the cryptographic proof 130 as the public ledger 132 that establishes chains of blocks of immutable evidence.

Two party verification is possible. Because both the account receivable 50 and the account payable 100 may be registered to the blockchain data layer 120 (as FIGS. 18-19 illustrate), the blockchain data layer 120 may be a quick and simple verification mechanism for debt sales. Again, any party, entity, or device that subscribes to the blockchain data layer 120 may thus access, read, and/or store the proofs 80 of the account receivable 50, the account payable 100, and/or the authentication credentials 112. Interested debt buyers may inspect the public blockchain 126, obtain the authentication credentials 78 and 112, retrieve the accounting reports 76 and 110, and bid, buy, or pass.

Figure 20:
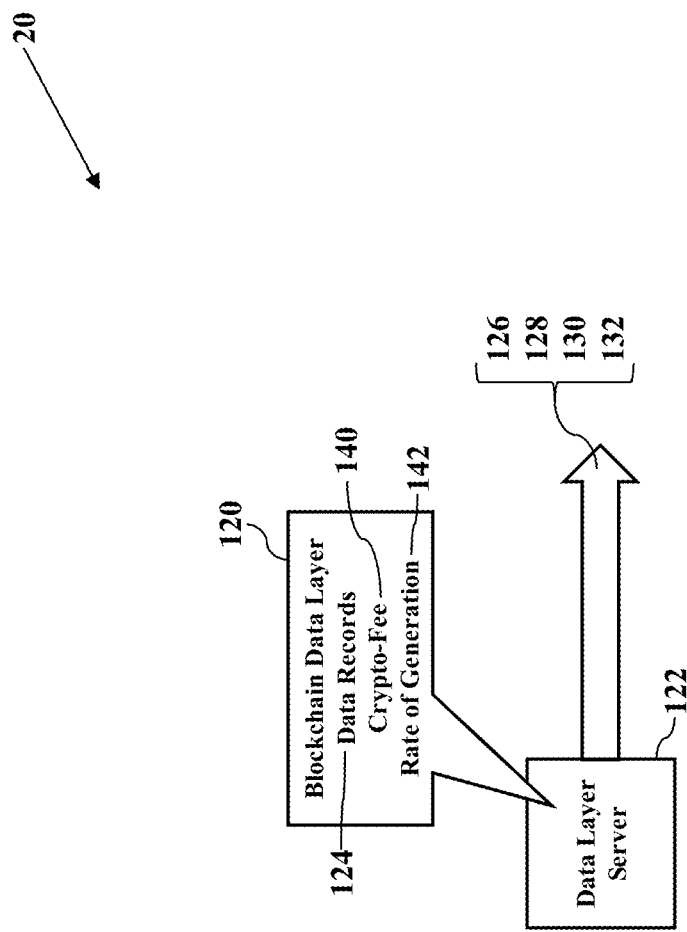

FIG. 20 illustrates crypto-payments. When the data layer server 122 generates the data records 124 in the blockchain data layer 120, an operator or service provider of the data layer server 122 and/or the blockchain data layer 120 may be compensated. That is, the data layer server 122 and/or the blockchain data layer 120 provides a service in exchange for any form of compensation. While the compensation may be a conventional currency, FIG. 20 illustrates a cryptographic fee 140. Here, then, the cryptographic fee 140 may be based on the data records 124 generated in the blockchain data layer 120. That is, exemplary embodiments may charge, impose, and/or process the cryptographic fee 140 based on the number or quantity of the data records 124 in the blockchain data layer 120. That is, as the data records 124 are generated, exemplary embodiments may sum or count the data records 124 that are generated over time (such as per second, per minute, or other interval). A cloud-based blockchain service, for example, calls or initializes a counter having an initial value (such as zero). At an initial time, the counter commences or starts counting or summing the number of the data records 124 that are associated with the account receivable 50 and/or the account payable 100. The counter stops counting or incrementing at a final time and/or when no more data records 124 are generated. Regardless, exemplary embodiments determine or read the final value or count. Exemplary embodiments may then sum or tally a total number of the data records 124 that were generated and perhaps even a rate 142 of generation (e.g., the sum or count over time). The service provider may then process the cryptographic fee 140 based on the total number of the data records 124 and/or the rate 142 of generation within the blockchain data layer 120.

Figure 21:
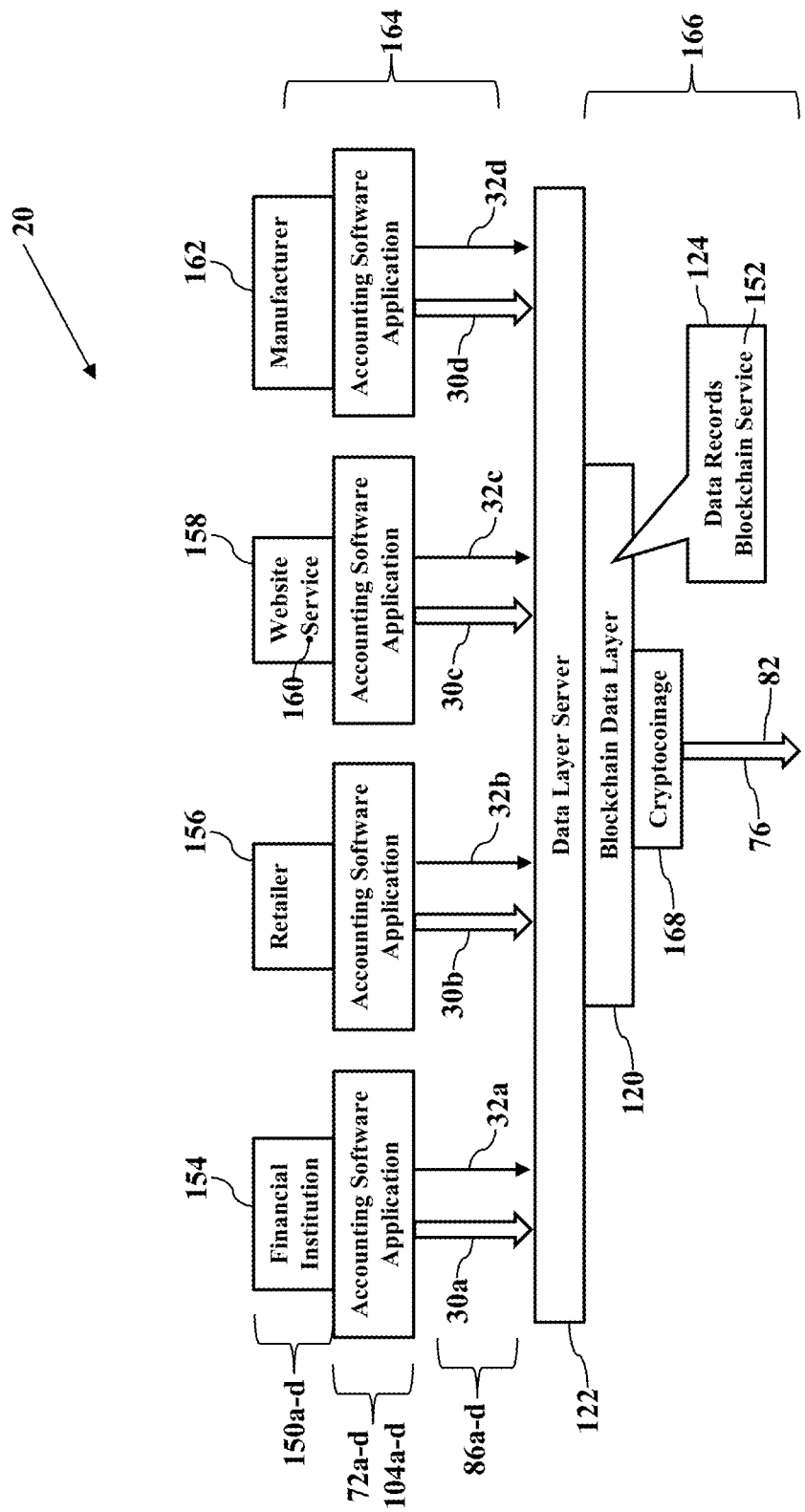

FIG. 21 illustrates client entities. As the reader may envision, the blockchain data layer 120 may serve many clients or customers. Here multiple, different entities 150 may each send data describing their account receivables 50 and/or account payables 100 to the data layer server 122 to receive a blockchain service 152. The data layer server 122 may then generate the data records 124 in the blockchain data layer 120 as a component of the blockchain service 152. While exemplary embodiments may be applied to any number of clients, industries, or services, FIG. 21 illustrates a simple example of four (4) different entities 150a-d. First entity 150a, for example, represents a server, operated on behalf of a bank, lender, or other financial institution 154, that executes its accounting software application 72 and/or 104 to send its electronic transactional data 32a and/or the blockchain 30a (describing its account receivables 50 and/or account payables 100) to the data layer server 122. The electronic transactional data 32a may be raw and unencrypted. However, the electronic transactional data 32a may be encrypted (perhaps via the encryption 62 using the cryptographic key that is unique to the financial institution 154 and/or the accounting software application 72 and/or 104). The financial institution 154 may additionally or alternatively sends its blockchain 30a to the data layer server 122. However the electronic transactional data 32a is received and discerned, the data layer server 122 then generates the data records 124 in the blockchain data layer 120.

Other entities may also be served. As FIG. 21 further illustrates, a second entity 150b represents a server, operated on behalf of any retailer 156 (such as HOME DEPOT®, KOHL'S®, or WALMART®), that sends and/or encrypts its electronic transactional data 32b (perhaps as its blockchain 30b). Third entity 150c represents a website 158 offering a service 160 (such as AMAZON®, NETFLIX®, or GOOGLE®) that sends and/or encrypts its electronic transactional data 32c (perhaps as its blockchain 30c). Fourth entity 150d represents an automotive or other manufacturer or supplier 162 (such as FORD®, TOYOTA®, or DELPHI®) that sends and/or encrypts its electronic transactional data 32d (perhaps as its blockchain 30d). The entities 150a-d may thus use their respective software applications 72a-d or 104a-d to provide a first layer 164 of cryptographic hashing. Each entity 150a-d may then send their respective private blockchains 30a-d to the blockchain data layer 120, and the blockchain data layer 120 may add a second layer 166 of cryptographic hashing. The blockchain data layer 120 thus generates the public blockchain 126 as a public resource or utility for record keeping. Any entity 150 that subscribes to the blockchain data layer 120 (such as by acquiring and/or spending a cryptocoinage 168) may thus access, read, and/or store the proofs in the public blockchain 126. The blockchain data layer 120, in other words, acts as the public ledger 132 that establishes chain of blocks of immutable evidence.

Cryptocoinage may be exchanged. Each entity 150a-d may establish its own private cryptocoinage. Each entity's respective software applications 72a-d or 104a-d may create and/or issue its cryptocoinage (such as respective entity-specific tokens). Each entity 150a-d may also establish its own usage restrictions and according to rules governing ownership, trade, and other policies. Each entity 150a-d may generate and sends its respective electronic transaction data 32a-d to the blockchain data layer 120 for documentation.

Each entity 150a-d may also specify their respective digital contract 86a-d. When any of the private blockchains 30a-d is received, the blockchain data layer 120 may coordinate execution of any digital contract 86a-d. The blockchain data layer 120, for example, may inspect any private blockchain 30a-d and identify any information associated with the digital contract 86a-d. The blockchain data layer 120 may then execute the digital contract 86a-d, and/or the blockchain data layer 120 may identify a service provider that executes the digital contract 86a-d. The blockchain data layer 120, in other words, may manage the execution of the digital contracts 86a-d according to a subcontractor relationship. A provider of the blockchain data layer 120 may then be compensated via any entity's cryptocoinage and/or the blockchain data layer's cryptocoinage 168.

Figure 22:
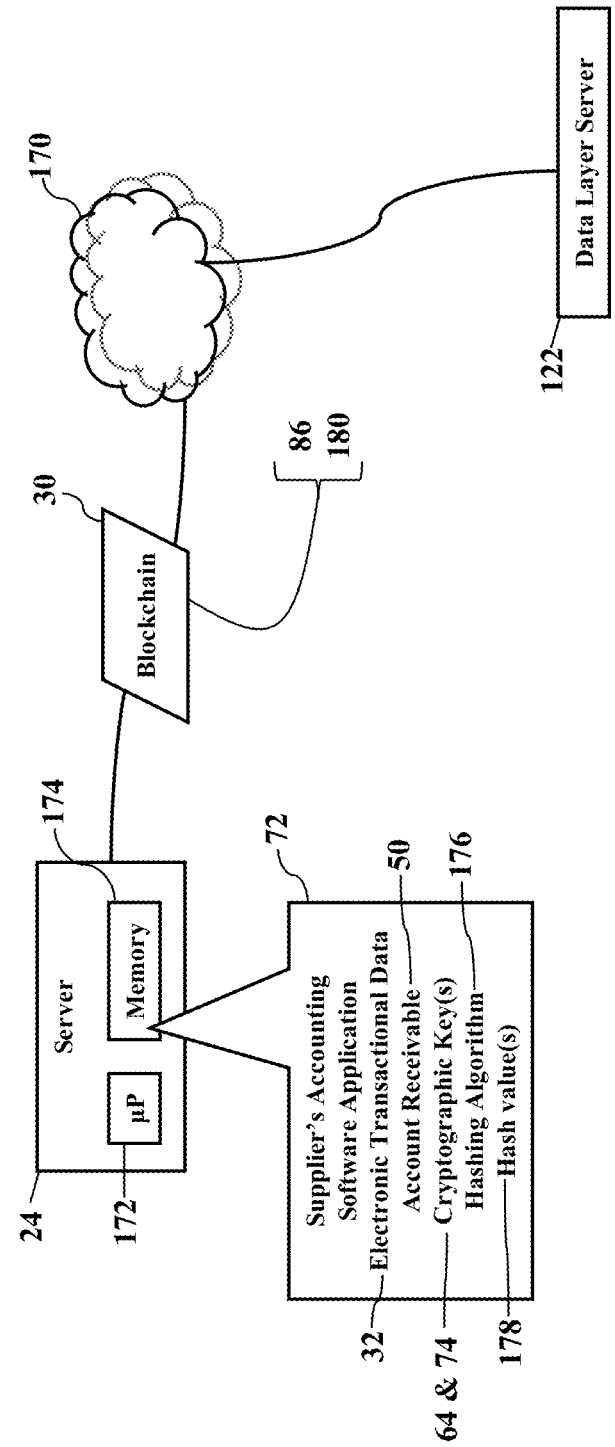
FIGS. 22-26 are more detailed illustrations of an operating environment, according to exemplary embodiments.

FIGS. 22-26 are more detailed illustrations of an operating environment, according to exemplary embodiments. FIG. 22 illustrates the supplier's server 24 communicating with the data layer server 122 via a communications network 170. The supplier's server 24 operates on behalf of the supplier 52 and generates the supplier's public or private blockchain 30. The supplier's server 24 has a processor 172 (e.g., "μP"), application specific integrated circuit (ASIC), or other component that executes the supplier's accounting software application 72 stored in a local memory device 174. The supplier's server 24 has a network interface to the communications network 170, thus allowing two-way, bidirectional communication with the data layer server 122. The supplier's accounting software application 72 includes instructions, code, and/or programs that cause the supplier's server 24 to perform operations, such as generating the electronic transactional data 32 representing the account receivable 50. The supplier's accounting software application 72 may also call, invoke, and/or apply a cryptographic algorithm that uses the cryptographic keys 64 and/or 74 to encrypt the electronic transactional data 32. Moreover, the supplier's accounting software application 72 may additionally call, invoke, and/or apply an electronic representation of a hashing algorithm 176 to the unencrypted or encrypted electronic transactional data 32. The hashing algorithm 176 thus generates one or more hash values 178, which may be incorporated into the blockchain 30. The supplier's accounting software application 72 then instructs the supplier's server 24 to send the blockchain 30 via the communications network 170 to any destination, such as a network address (e.g., Internet protocol address) associated with the data layer server 122.

The digital contract 86 may also be identified. The supplier's accounting software application 72 may also instruct the supplier's server 24 to specify the digital contract 86 as informational content in the blockchain 30. For example, the digital contract 86 may be identified by a contract identifier 180. The contract identifier 180 is any digital identifying information that uniquely identifies or references the digital contract 86. The contract identifier 180 may be an alphanumeric combination that uniquely identifies a vendor and/or version of the digital contract 86 and/or a processor or executioner of the digital contract 86. The contract identifier 180 may also be one of the unique hash values 178 (perhaps generated by the hashing algorithm 176) that is included within, or specified by, the blockchain 30. Similarly, the electronic transactional data 32 may identify the parties to the digital contract 86, their respective performance obligations and terms, and consideration.

Figure 23:
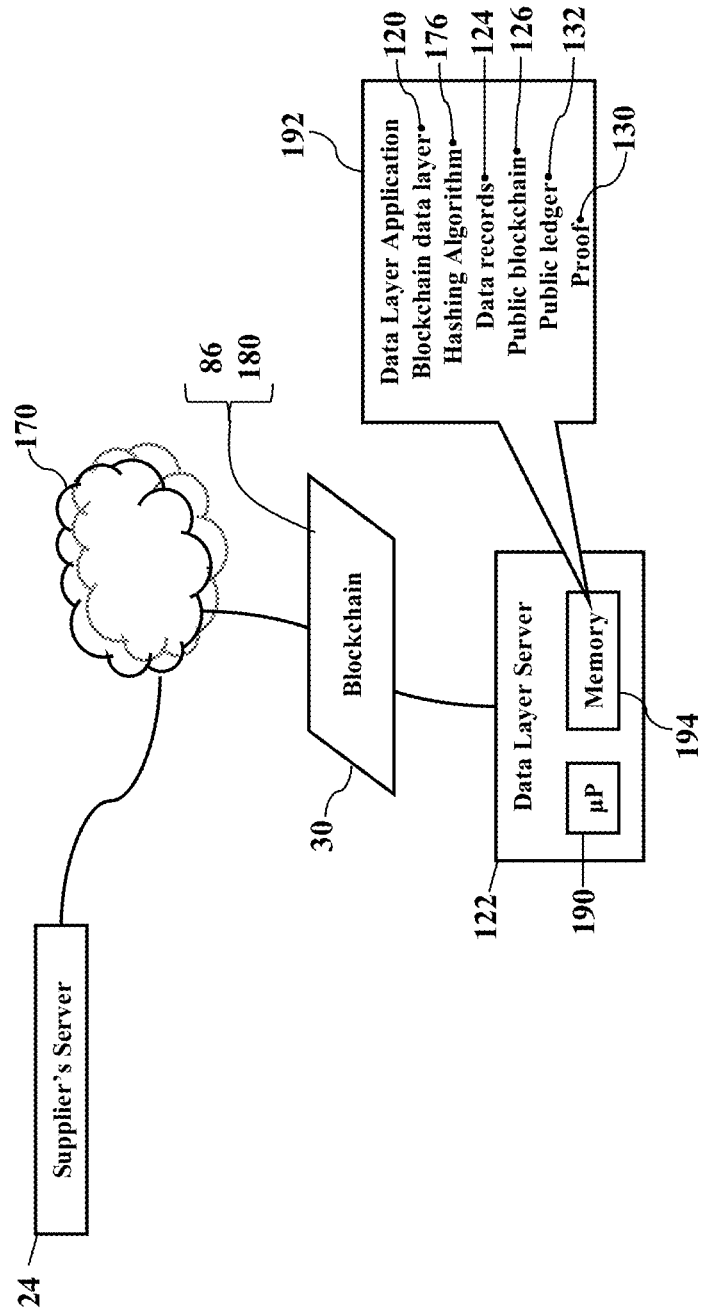

FIG. 23 illustrates the blockchain data layer 120. The data layer server 122 has a processor 190 (e.g., "μP"), application specific integrated circuit (ASIC), or other component that executes a data layer application 192 stored in a local memory device 194. The data layer server 122 has a network interface to the communications network 170. The data layer application 192 includes instructions, code, and/or programs that cause the data layer server 122 to perform operations, such as receiving the electronic transactional data 32, the blockchain 30, the digital contract 86, the contract identifier 180, and/or any contractual parameters associated with the digital contract 86. The data layer application 192 then causes the data layer server 122 to generate the blockchain data layer 120. The data layer application 192 may optionally call, invoke, and/or apply the hashing algorithm 176 to the data records 124 contained within the blockchain data layer 120. The data layer application 192 may also generate the public blockchain 126. The data layer application 192 may thus generate the public ledger 132 that publishes, records, or documents the digital contract 86, the contract identifier 180, and/or the contractual parameters. Indeed, if the data layer application 192 processes and/or manages the digital contract 86, the data records 124 may document any processing or execution, and the data layer application 192 may optionally apply the hashing algorithm 176 to the data records 124 to generate the cryptographic proof 130 of the digital contract 86.

Figure 24:
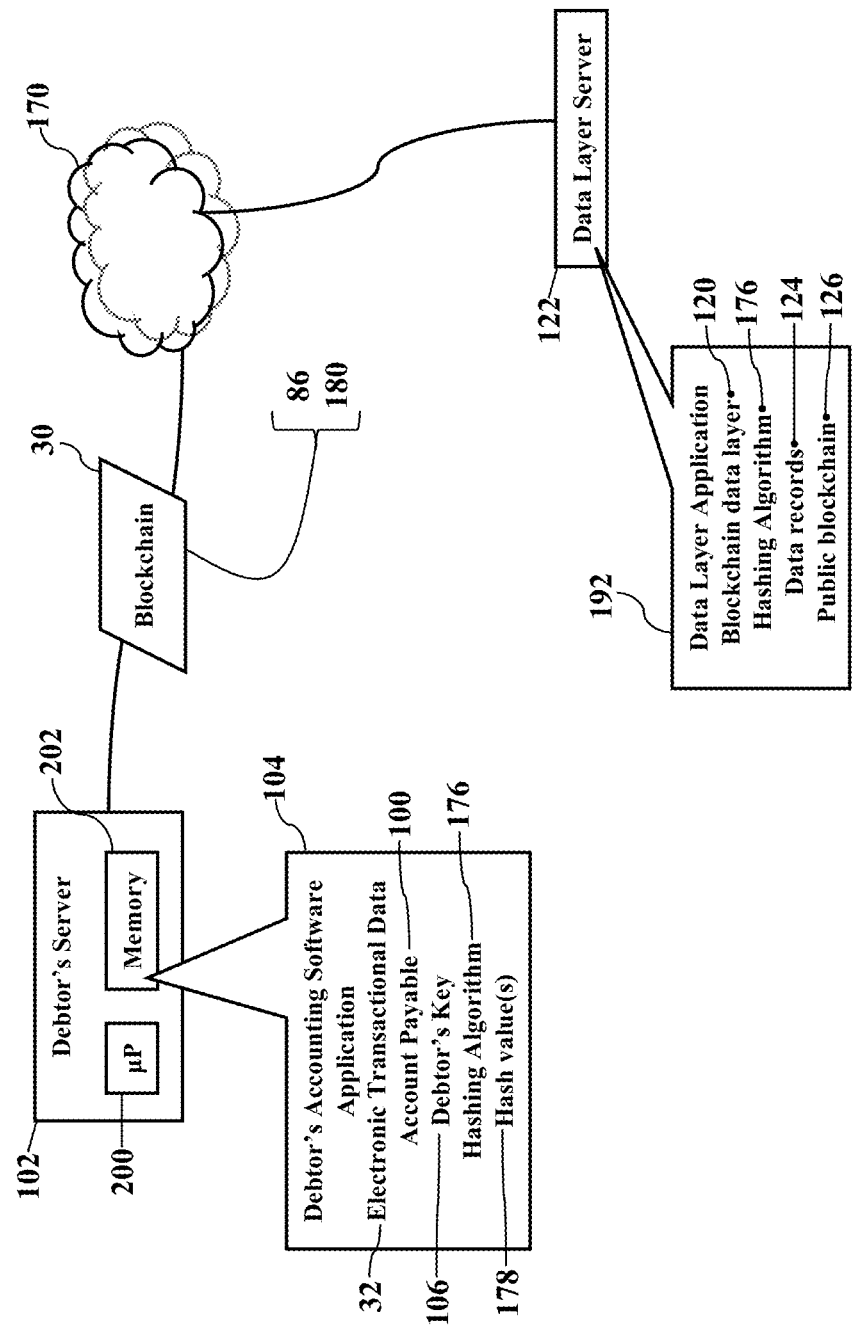

FIG. 24 illustrates the debtor's server 102. The debtor's server 102 communicates with the data layer server 122 via the communications network 170. The debtor's server 102 operates on behalf of the debtor 56 and generates the debtor's public or private blockchain 30. The debtor's server 102 has a processor 200 (e.g., "μP"), application specific integrated circuit (ASIC), or other component that executes the debtor's accounting software application 104 stored in a local memory device 202. The debtor's server 102 has a network interface to the communications network 170, thus allowing two-way, bidirectional communication with the data layer server 122. The debtor's accounting software application 104 includes instructions, code, and/or programs that cause the debtor's server 102 to perform operations, such as generating the electronic transactional data 32 representing the account payable 100. The debtor's accounting software application 104 may also call, invoke, and/or apply a cryptographic algorithm that uses the debtor's cryptographic key 106 to encrypt the electronic transactional data 32. Moreover, the debtor's accounting software application 104 may additionally call, invoke, and/or apply an electronic representation of the hashing algorithm 176 to the unencrypted or encrypted electronic transactional data 32. The hashing algorithm 176 thus generates one or more hash values 178, which may be incorporated into the blockchain 30. The debtor's accounting software application 104 then instructs the debtor's server 102 to send the blockchain 30 via the communications network 170 to any destination, such as the network address (e.g., Internet protocol address) associated with the data layer server 122.

The digital contract 86 may also be identified. The debtor's accounting software application 104 may also instruct the debtor's server 102 to specify the digital contract 86 as informational content in the blockchain 30. For example, the digital contract 86 may be identified by the contract identifier 180. Similarly, the electronic transactional data 32 may identify the parties to the digital contract 86, their respective performance obligations and terms, and consideration.

The blockchain data layer 120 may be generated. The data layer server 122 receives the electronic transactional data 32, the blockchain 30, the digital contract 86, the contract identifier 180, and/or any contractual parameters associated with the digital contract 86. The data layer application 192 then causes the data layer server 122 to generate the blockchain data layer 120. The data layer application 192 may optionally call, invoke, and/or apply the hashing algorithm 176 to the data records 124 contained within the blockchain data layer 120. The data layer application 192 may also generate the public blockchain 126.

Figure 25:
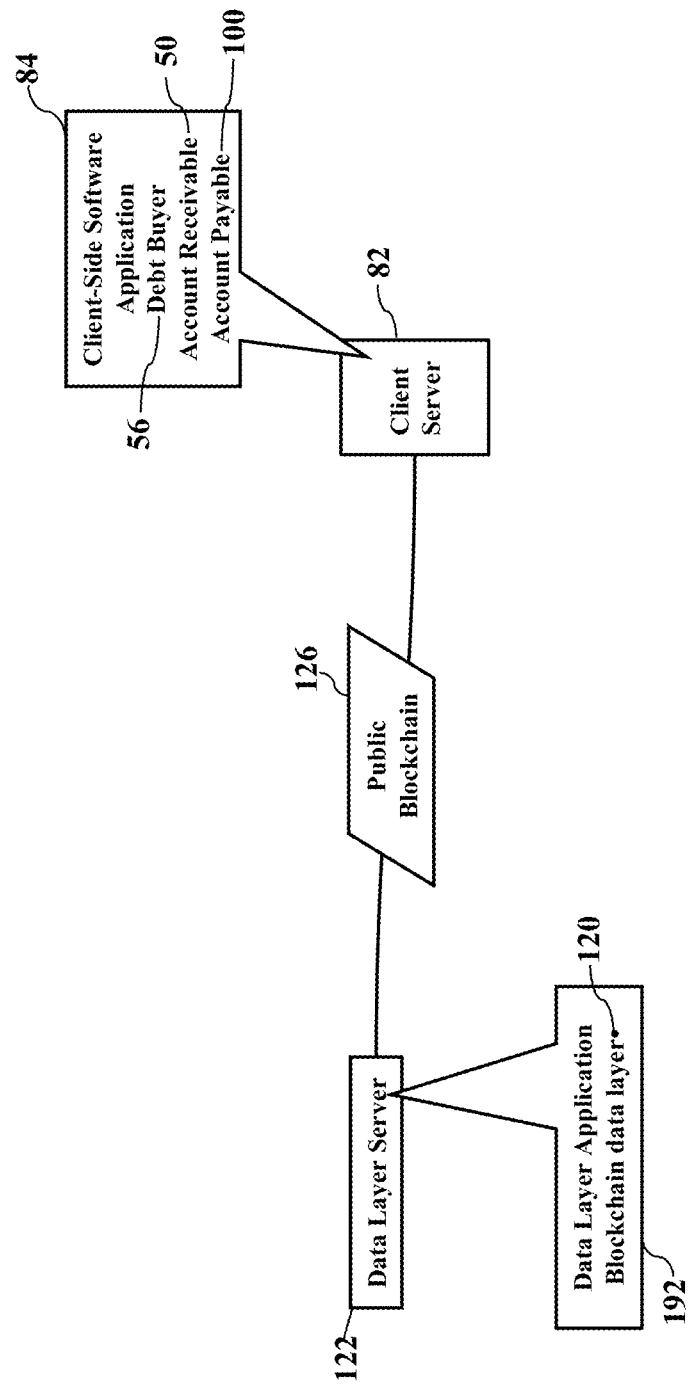

FIG. 25 illustrates an additional publication mechanism. Once the data records 124 are generated, the data layer server 122 may generate and distribute the public blockchain 126 to subscribers and to other parties. For example, suppose the client server 82 is an authorized destination or subscriber for the public blockchain 126. The data layer application 192 instructs the data layer server 122 to send the public blockchain 126 (via the communications network 170 illustrated in FIGS. 22-24) to the network address (e.g., Internet protocol address) associated with the client server 82. Once the client server 82 receives the public blockchain 126, the client server 82 has a hardware processor and solid-state memory device (not shown for simplicity) that stores and executes the client-side software application 84. The client-side software application 84, when executed, has programming or code that instructs or causes the client server 82 to perform operations, such as receiving the public blockchain 126, reading one or more of its blocks of data, and comparing any data or information that describes the account receivable 50 and/or the account payable 100. The client server 82 may then make or infer a decision to buy, or decline to buy, the account receivable 50. Moreover, the client-side software application 84 may also initiate a cryptocoinage transaction in exchange for the public blockchain 126.

Figure 26:
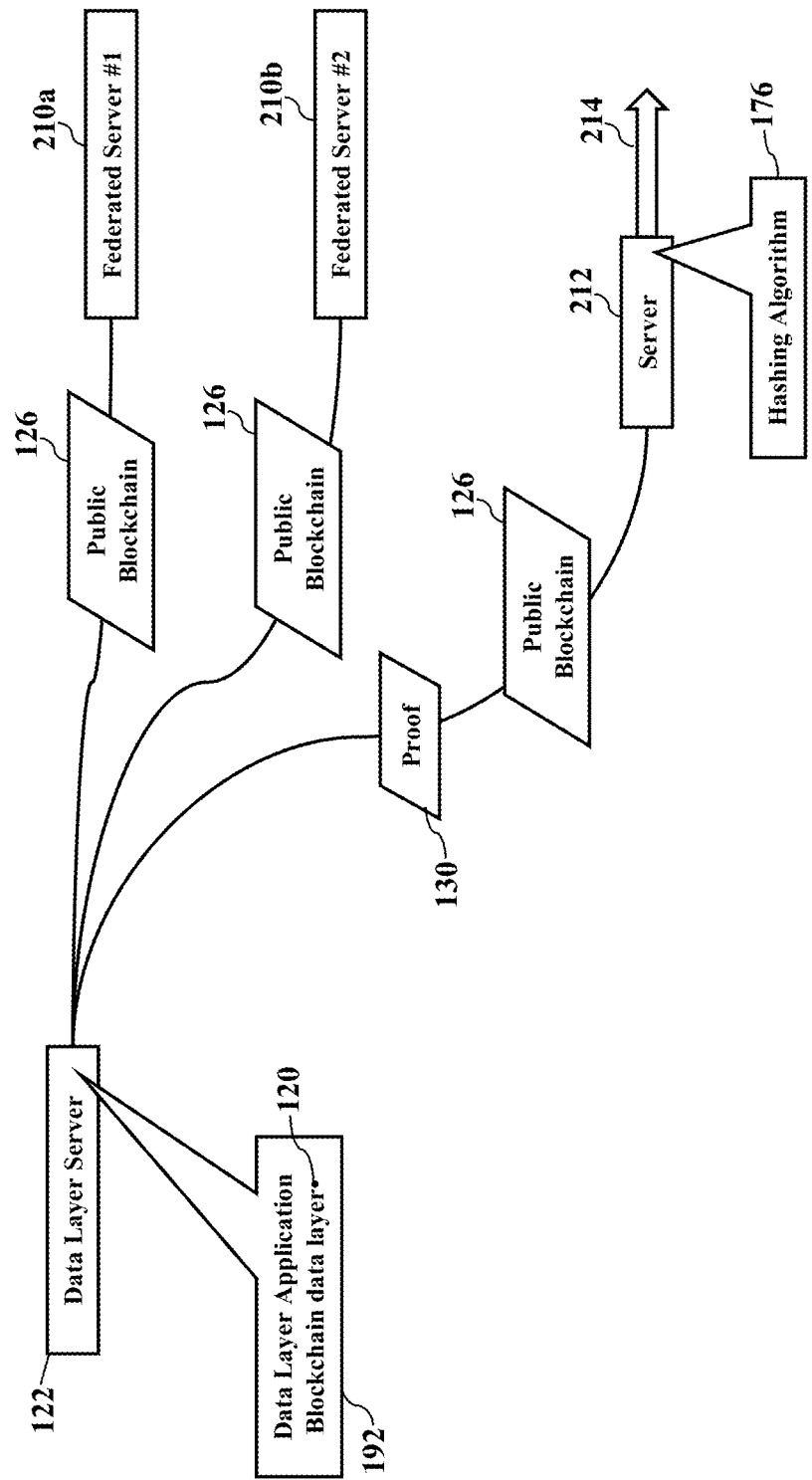

FIG. 26 illustrates still more publication mechanisms. Once the blockchain data layer 120 is generated, the blockchain data layer 120 may be published in a decentralized manner to any destination. The data layer server 122, for example, may generate and distribute the public blockchain 126 (via the communications network 170 illustrated in FIGS. 22-24) to one or more federated servers 210. While there may be many federated servers 210, for simplicity FIG. 26 only illustrates two (2) federated servers 210a and 210b. The federated servers 210a and 210b provide a service and, in return, they are compensated according to a compensation or services agreement or scheme.

Exemplary embodiments include still more publication mechanisms. For example, the cryptographic proof 130 and/or the public blockchain 126 may be sent (via the communications network 170 illustrated in FIGS. 22-24) to a server 212. The server 212 may then add another, third layer of cryptographic hashing (perhaps using the hashing algorithm 176) and generate another or second public blockchain 214. While the server 212 and/or the public blockchain 126 may be operated by, or generated for, any entity, exemplary embodiments may integrate another cryptographic coin mechanism. That is, the server 212 and/or the public blockchain 126 may be associated with BITCOIN®, ETHEREUM®, RIPPLE®, or other cryptographic coin mechanism. The cryptographic proof 130 and/or the public blockchain 126 may be publicly distributed and/or documented as evidentiary validation. The cryptographic proof 130 and/or the public blockchain 126 may thus be historically and publicly anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the supplier's server 24, the client server 84, the debtor's server 102, and the data layer server 122 communicate via the communications network 170, the supplier's server 24, the client server 84, the debtor's server 102, and the data layer server 122 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 27:
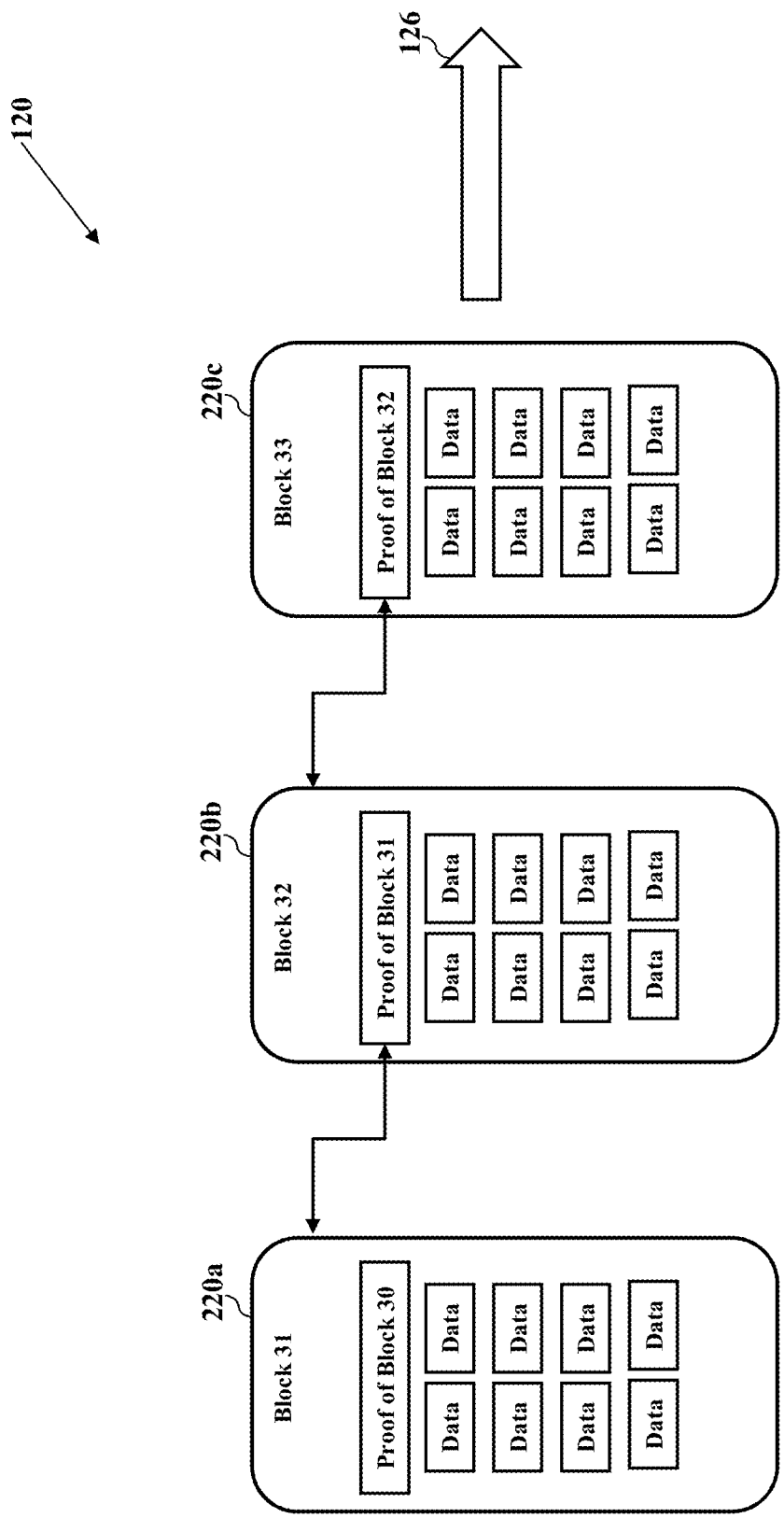
FIGS. 27-31 illustrate a blockchain data layer, according to exemplary embodiments.

FIGS. 27-31 further illustrate the blockchain data layer 120, according to exemplary embodiments. The blockchain data layer 120 chains hashed directory blocks 220 of data into the public blockchain 126. For example, the blockchain data layer 120 accepts input data (such as the supplier's or debtor's blockchain 30 illustrated in FIGS. 1-21) within a window of time. While the window of time may be configurable from fractions of seconds to hours, exemplary embodiments use ten (10) minute intervals. FIG. 27 illustrates a simple example of only three (3) directory blocks 220*a-c* of data, but in practice there may be millions or billions of different blocks. Each directory block 220 of data is linked to the preceding blocks in front and the following or trailing blocks behind. The links are created by hashing all the data within a single directory block 220 and then publishing that hash value within the next directory block.

Figure 28:
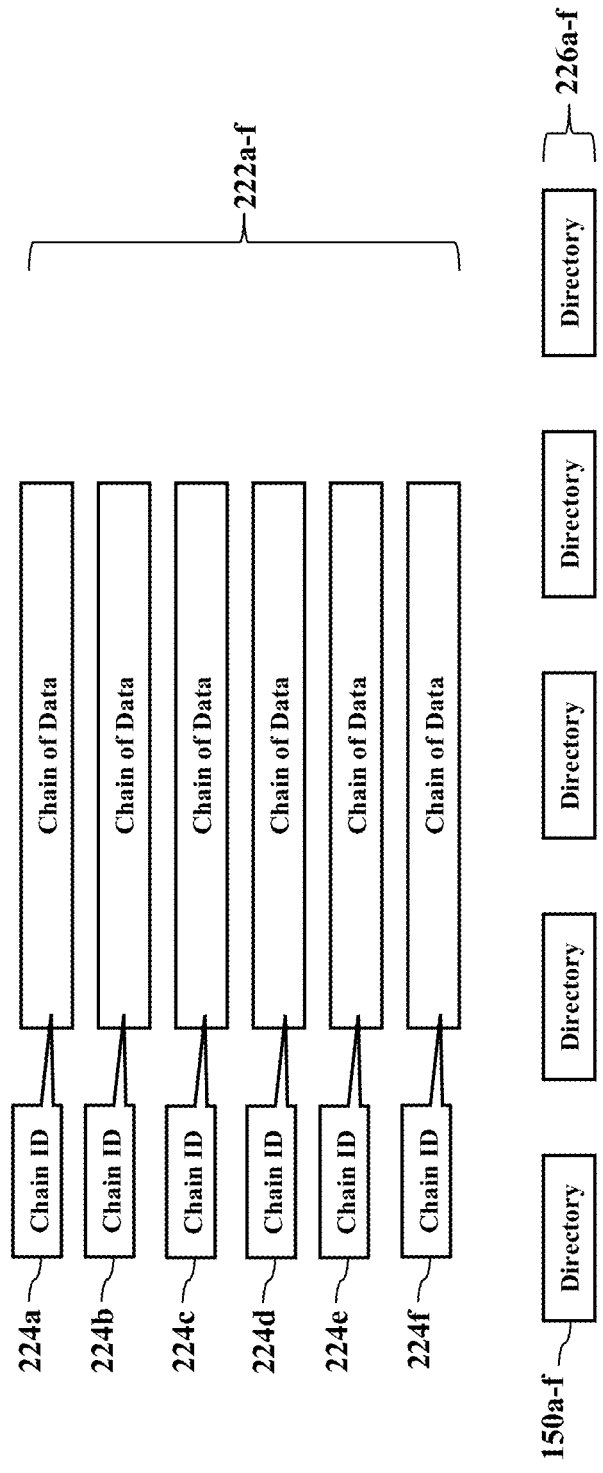

As FIG. 28 illustrates, published data may be organized within chains 222. Each chain 222 is created with an entry that associates a corresponding chain identifier 224. Each entity 32*a-f*, in other words, may have its corresponding chain identifier 224*a-d*. The blockchain data layer 120 may thus track any data associated with the entity 150*a-f* with its corresponding chain identifier 224*a-d*. New and old data in time may be associated with, linked to, identified by, and/or retrieved using the chain identifier 224*a-d*. Each chain identifier 224*a-d* thus functionally resembles a directory 226*a-d* (e.g., files and folders) for organized data entries according to the entity 32*a-f*.

Figure 29:
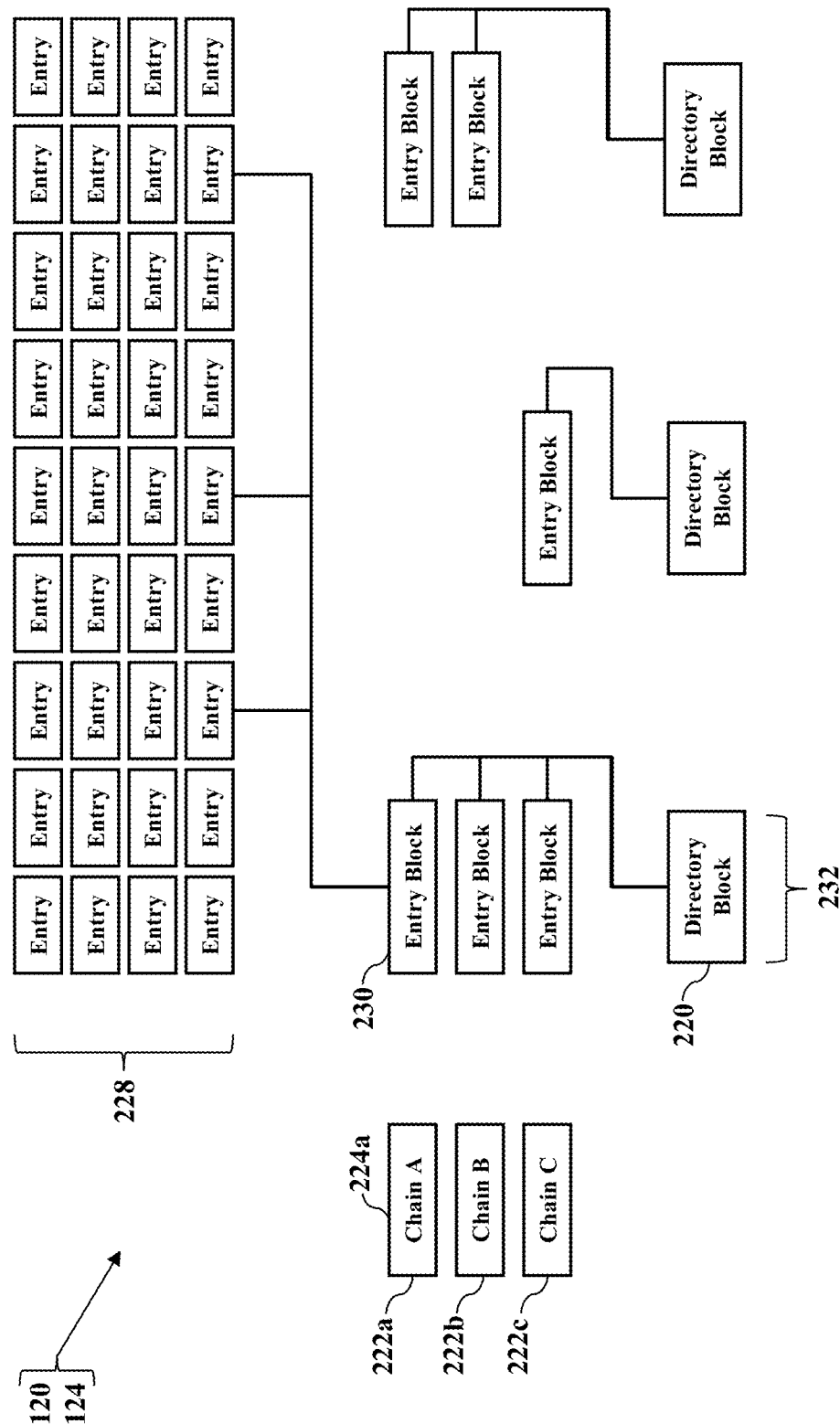

FIG. 29 illustrates the data records 124 in the blockchain data layer 120. As data is received as an input (such as the blockchain 30 and/or the digital contract 86 illustrated in FIGS. 1-21), data is recorded within the blockchain data layer 120 as an entry 228. While the data may have any size, small chunks (such as 10 KB) may be pieced together to create larger file sizes. One or more of the entries 228 may be arranged into entry blocks 230 representing each chain 222 according to the corresponding chain identifier 224. New entries for each chain 222 are added to their respective entry block 230 (again perhaps according to the corresponding chain identifier 224). After the entries 228 have been made within the proper entry blocks 230, all the entry blocks 230 are then placed within in the directory block 220 generated within or occurring within a window 232 of time. While the window 232 of time may be chosen within any range from seconds to hours, exemplary embodiments may use ten (10) minute intervals. That is, all the entry blocks 230 generated every ten minutes are placed within in the directory block 220. The electronic transactional data 32 representing the account receivable 50 and/or the account payable 100 may thus be carried into the data records 124 in the blockchain data layer 120.

Figure 30:
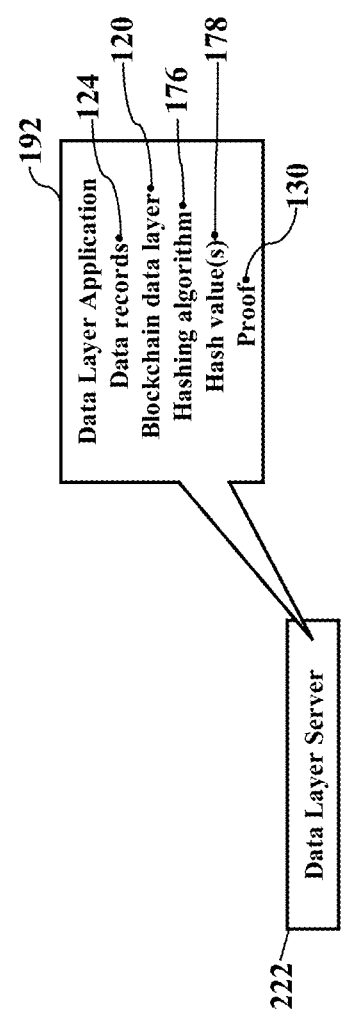

FIG. 30 illustrates cryptographic hashing. The data layer server 122 executes the data layer application 192 to generate the data records 124 in the blockchain data layer 120. The data layer application 192 may then instruct the data layer server 122 to execute the hashing algorithm 176 on the data records 124 (such as the directory block 220 illustrated in FIGS. 27-29). The hashing algorithm 176 thus generates one or more hash values 178 as a result, and the hash values 178 represent the hashed data records 124. As one example, the blockchain data layer 120 may apply a Merkle tree analysis to generate a Merkle root (representing a Merkle proof 130) representing each directory block 220. The blockchain data layer 120 may then publish the Merkle proof 130 (as this disclosure explains).

Figure 31:
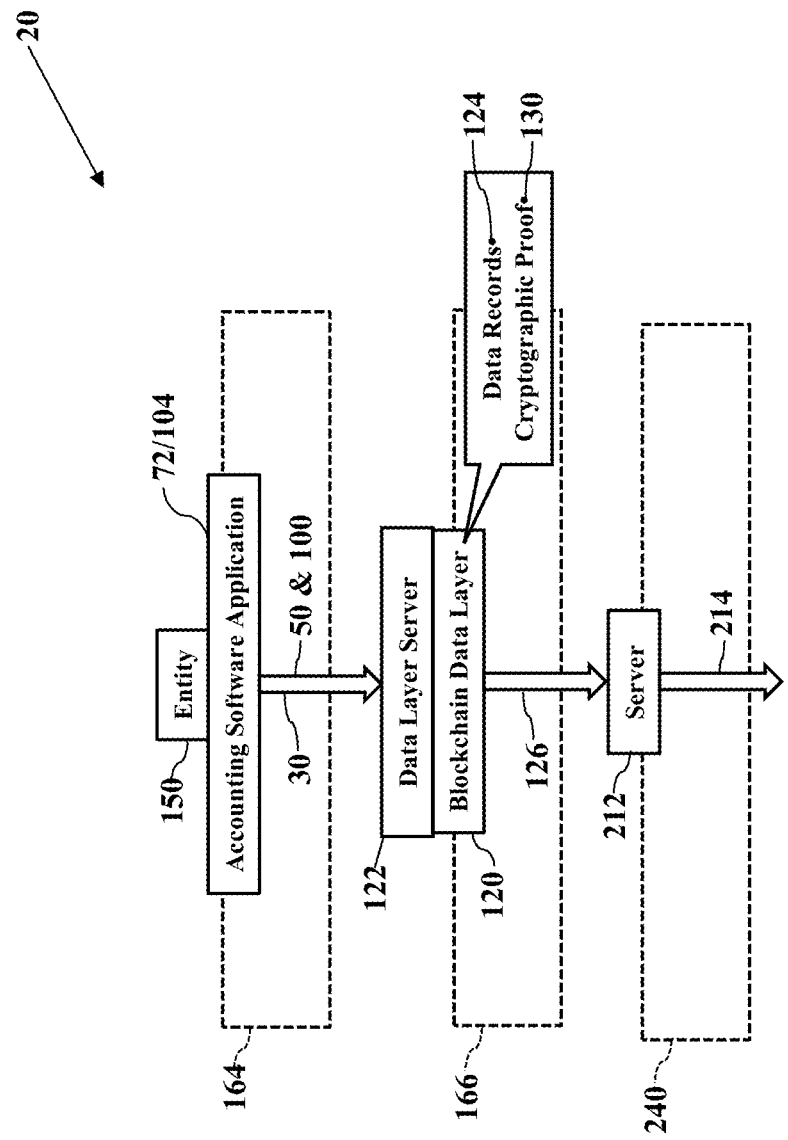
Figure 32:
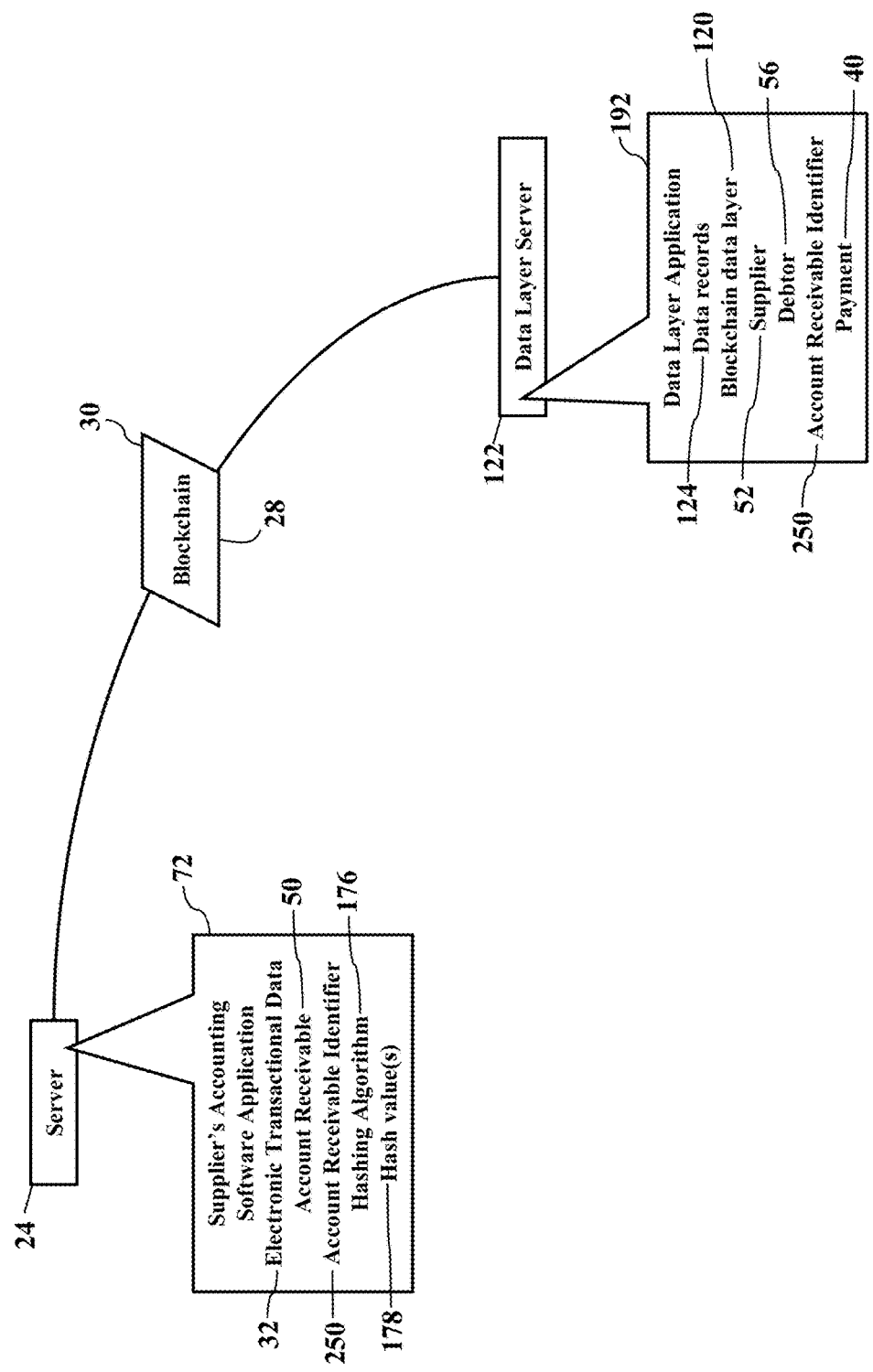
FIGS. 32-35 are detailed illustrations of an account receivable, according to exemplary embodiments.

FIG. 31 illustrates hierarchical hashing. The entity's accounting software application 72/104 provides the first layer 164 of cryptographic hashing and generates the public or private blockchain 30. The entity 150 then sends its blockchain 30 (perhaps referencing or specifying the account receivable 50 and/or the account payable 100 and/or digital contract 86) to the data layer server 122. The data layer server 122 generates the blockchain data layer 120. The data layer application 192 may optionally provide the second or intermediate layer 166 of cryptographic hashing to generate the cryptographic proof 130. The data layer server 122 may also publish any of the data records 124 as the public blockchain 126, and the cryptographic proof 130 may or may not also be published via the public blockchain 126. The public blockchain 126 and/or the cryptographic proof 130 may be optionally sent to the server 212 as an input to yet another public blockchain 214 (again, such as BITCOIN®, ETHEREUM®, or RIPPLE®) for a third layer 240 of cryptographic hashing and public publication. The first layer 164 and the second layer 166 thus ride or sit atop a conventional public blockchain 214 (again, such as BITCOIN®, ETHEREUM®, or RIPPLE®) and provide additional public and/or private cryptographic proofs 130.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

FIGS. 32-35 are more detailed illustrations of the account receivable 50, according to exemplary embodiments. The server 24 sends the blockchain 30 to the network address associated with the data layer server 122 that generates the blockchain data layer 120. The blockchain 30 may contain the electronic transactional data 32 describing the account receivable 50 (perhaps as one or more hashed blocks of data). For example, the electronic transactional data 32 may include an account receivable identifier 250 that is assigned to the account receivable 50. The account receivable identifier 250 uniquely identifies the account receivable 50. While the account receivable identifier 250 may have any structure or form, the account receivable identifier 250 is perhaps best understood as a unique alphanumeric or ASCII string that is assigned by the supplier's accounting software application 72. If the account receivable identifier 250 is hashed (using the hashing algorithm 176), the resulting hash value 178 may uniquely identify any blocks 28 of data in the blockchain 30 that reference the account receivable 50. The account receivable identifier 250 may additionally or alternatively be separately sent from the server 24 to the data layer server 122. Because the electronic transactional data 32 (and/or its corresponding hash value(s) 178) is an identifiable input to the data layer server 122 generating the blockchain data layer 120, the data records 124 may also carry or reference any portion of the any the electronic transactional data 32. For example, any of the data records 124 may also reference, be identified by, or be associated with the supplier 52, the debtor 56, and/or the account receivable identifier 250. Any of the electronic transactional data 32 may thus be a common indicator or reference data for tracking any transaction records documenting payments 40 on the account receivable 50. As a simple example, once the account receivable identifier 250 is assigned to the account receivable 50, any of the data records 124 in the blockchain data layer 120 may thus be commonly mapped or identified by the account receivable identifier 250 that is uniquely associated with the account receivable 50.

Figure 33:
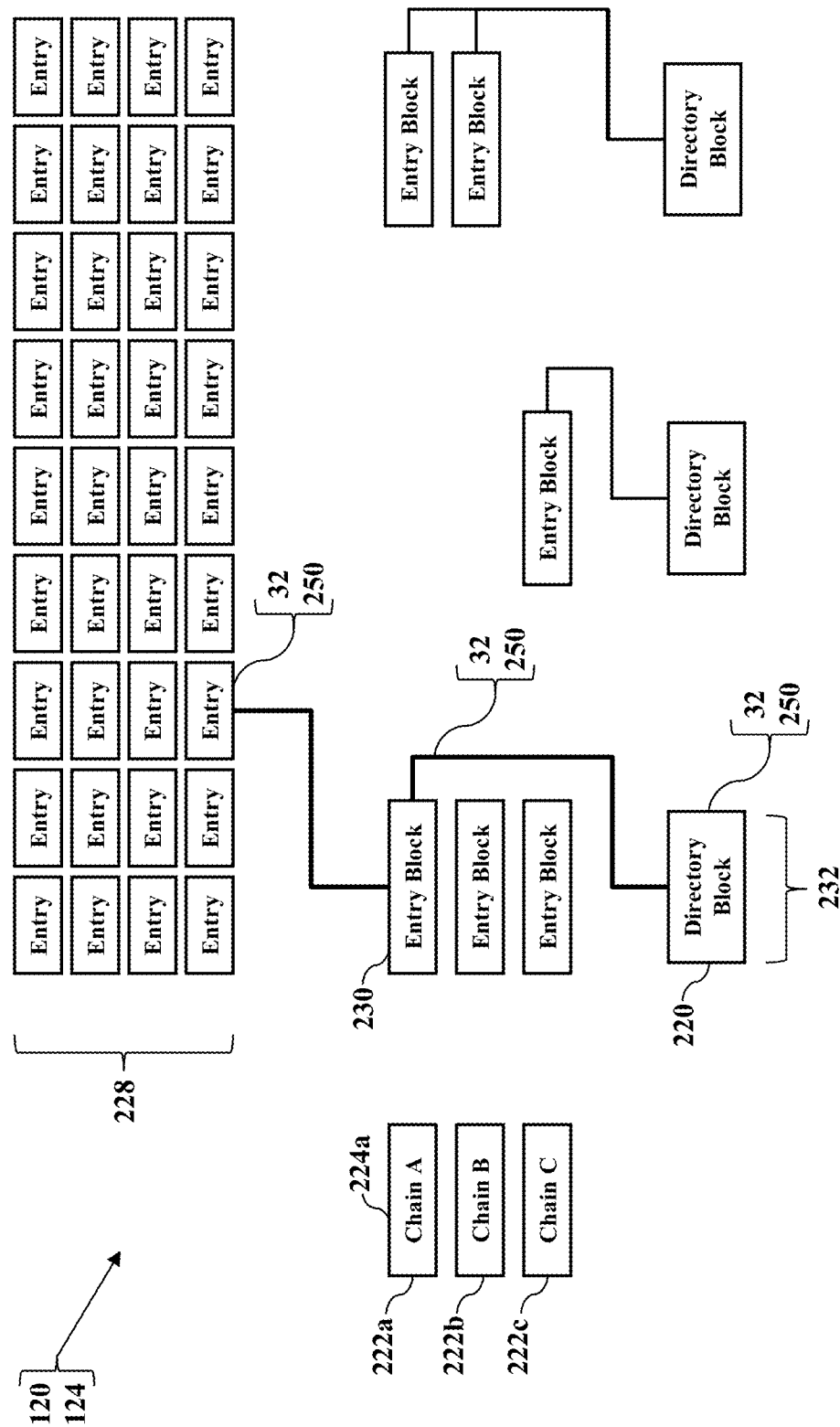

FIG. 33 illustrates a simple illustration. Once any of the electronic transactional data 32 (and/or its corresponding hash value) is received, the electronic transactional data 32 may propagate and be recorded within the blockchain data layer 120. The account receivable identifier 250, for example, may be recorded in any of the entries 228. The entry 228, and thus the account receivable identifier 250, may then be recorded and/or arranged as the entry block 230 and placed within the directory block 220. The entry 228, the entry block 230, and the directory block 220 may thus reference, specify, or be associated with, the account receivable identifier 250. The account receivable identifier 250 has thus propagated as informational content from the blockchain 30 and into and through the blockchain data layer 120. The account receivable identifier 250 thus hierarchically moves through the multiple layers of cryptographic hashing for public publication. The blockchain data layer 120 thus tracks any records of the subsequent transactions involving the account receivable identifier 250. In simple words, the blockchain data layer 120 may track payments, contractual performance, and/or satisfaction of the account receivable 50 via the data records 124 that reference or contain the account receivable identifier 250. Moreover, the blockchain data layer 120 may also track ownership and transfer of the account receivable 50, all via the common account receivable identifier 250.

Figure 34:
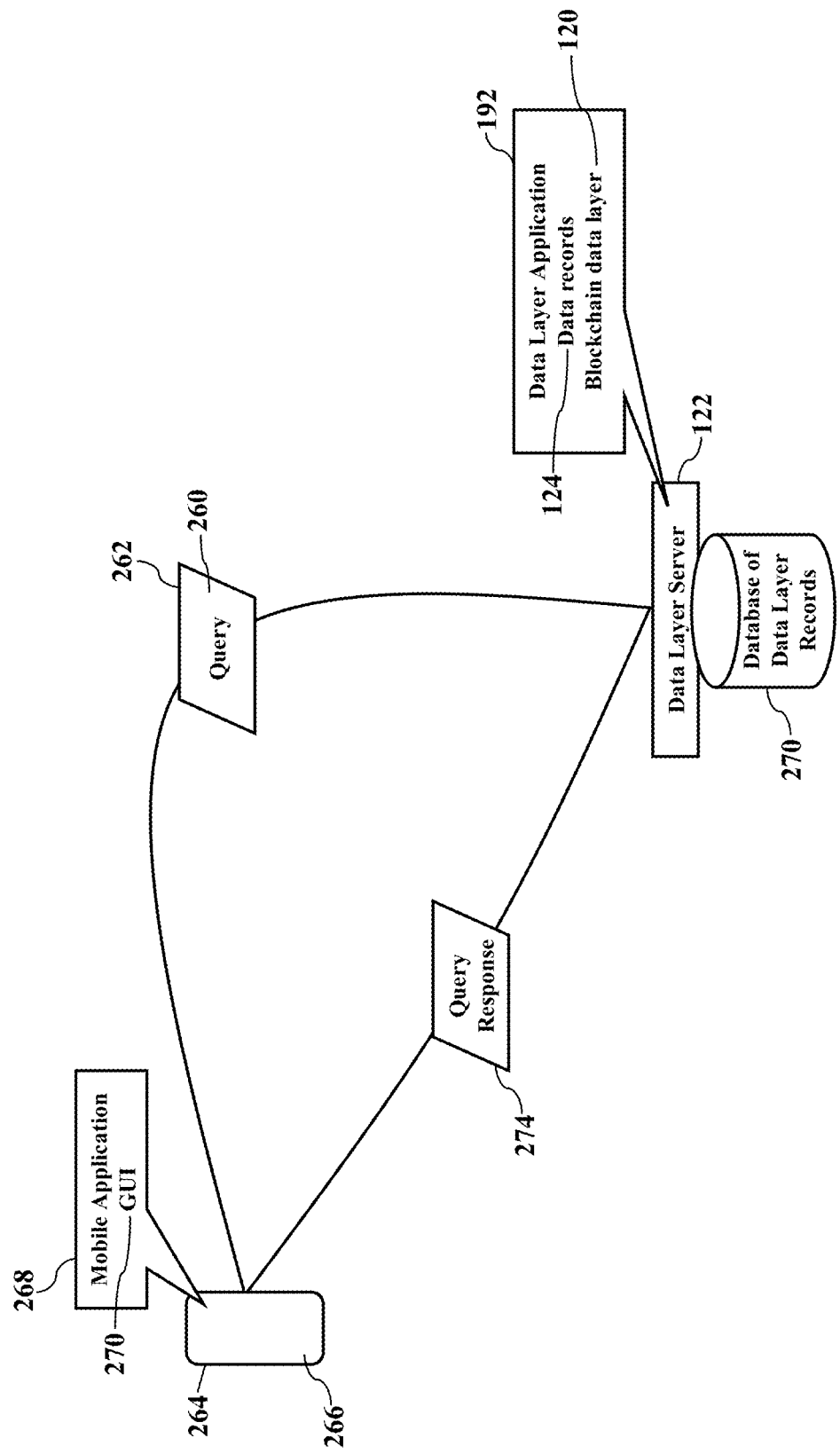

FIG. 34 illustrates a query mechanism. Here the data layer server 122 may be queried to identify the data records 124 that match a query parameter 260. The data layer server 122 receives a query 262 from any originating device 264. While the query 262 may be sent by the client server 82 (such as illustrated by FIG. 25), FIG. 33 illustrates a smartphone 266. Because most readers are thought familiar with mobile computing, the data layer application 192 may be configured to permit queries from any authorized device or user via the smartphone 266. The smartphone 266 has a hardware processor and solid-state memory device (not shown) that store and execute a mobile application 268. The mobile application 268 comprises code or instructions that cause the smartphone 266 to perform operations, such as generating a graphical user interface 270 that allows a user to input the query parameter 260. The mobile application 268 instructs the smartphone 266 to generate the query 262 specifying the query parameter 260. The mobile application 268 instructs the smartphone 266 to send the query 262 to the network address associated with the data layer server 122. When the data layer server 122 receives the query 262, the data layer server 122 may then consult or access a database 270 of data layer records. The database 270 of data layer records provides a referential record of the informational content contained within the blockchain data layer 120.

Figure 35:
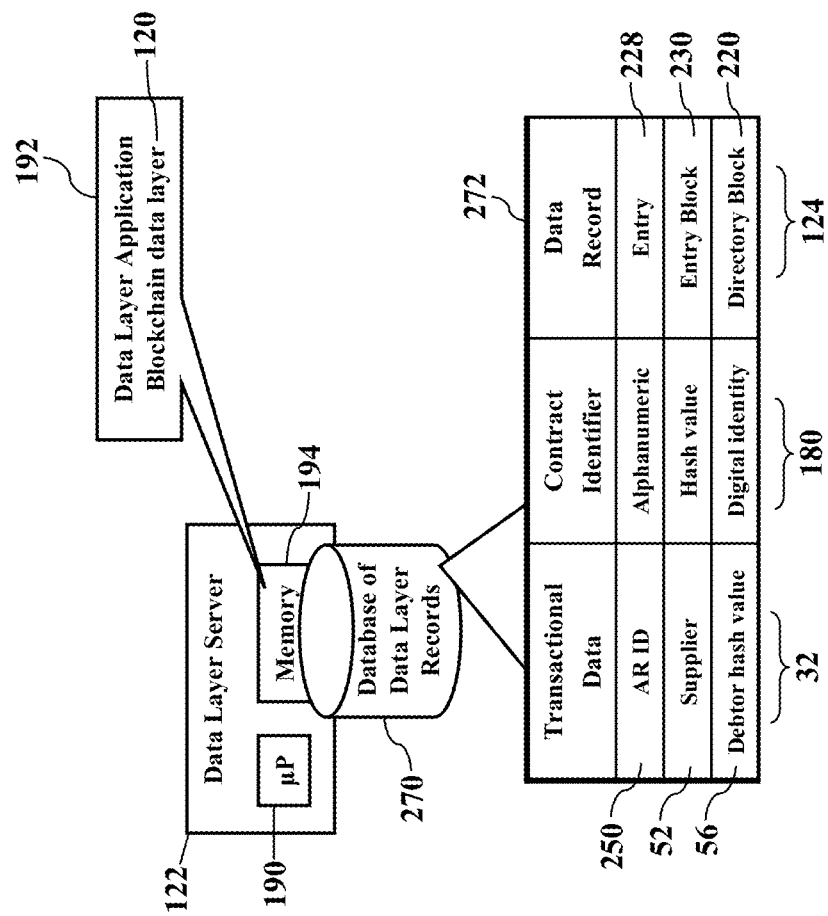

FIG. 35 further illustrates the database 270 of data layer records. FIG. 35 illustrates the data layer server 122 locally storing the database 270 of data layer records in its local memory device 194, but the database 270 of data layer records may be remotely stored and accessed via the communications network 170 (illustrated in FIGS. 22-24). Regardless, the data layer server 122 may query the database 270 of data layer records for any of the electronic transactional data 32 (and/or its corresponding hash value) and identify and/or retrieve any corresponding data records 124. While the database 270 of data layer records may have any logical structure, a relational database is thought the easiest to understand. FIG. 35 thus illustrates the database 270 of data layer records as a table 272 that maps, converts, or translates the electronic transactional data 32 (such as the account receivable identifier 250) to its corresponding contract identifier 180 and/or to its corresponding entry 228, entry block 230, and/or directory block 220 within the blockchain data layer 120. Whenever the data layer server 122 generates the entry 228, entry block 230, and/or directory block 220, the data layer server 122 may add an entry to the database 270 of data layer records. Over time, then, the database 270 of data layer tracks a comprehensive historical repository of the electronic transactional data 32. The data layer server 122 may then read or retrieve the entry 228, entry block 230, and/or directory block 220 containing or corresponding to the electronic transactional data 32. Moreover, because each entry 228, entry block 230, and/or directory block 220 may be time-stamped with a date and time, the database entries in the database 270 of data layer records may be retrieved and chronologically arranged to reveal any sequence or series of payments and transactions.

Returning to FIG. 34, a query response 274 is generated. The data layer server 122 identifies any database entries that match or sufficiently satisfy the query parameter 260. The data layer application 192 may then instruct the data layer server 122 to generate the query response 274 comprising or specifying any of the related database entries. The data layer application 192 may then instruct the data layer server 122 to send the query response 274 via the communications network 170 (illustrated in FIGS. 22-24) to the network address (e.g., Internet protocol address) associated with the requesting client device (such as the smartphone 266). The mobile application 268 may then instruct the smartphone 266 to generate the graphical user interface 270 that displays the query response 274.

Figure 36:
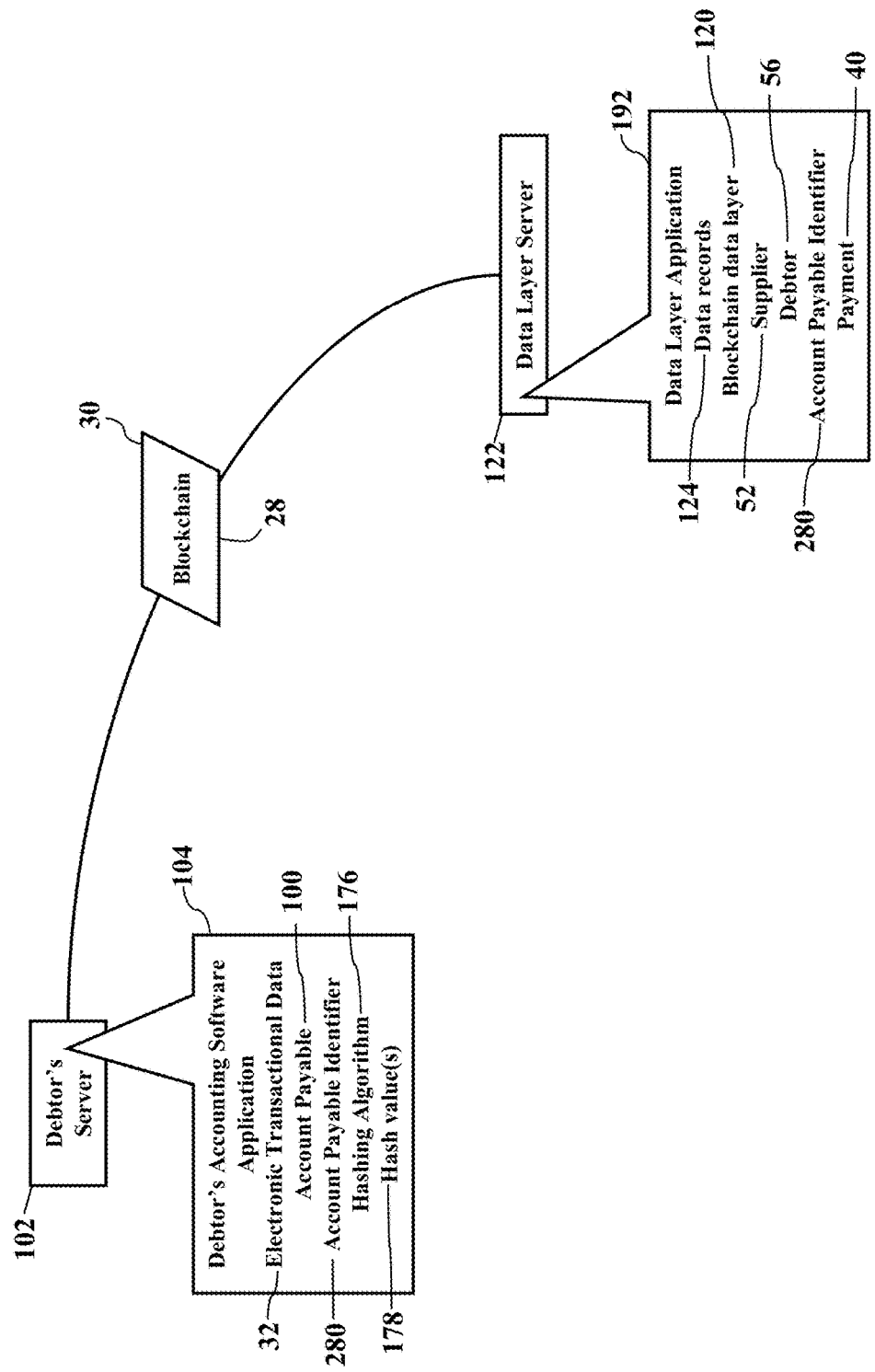
FIGS. 36-37 illustrate an account payable, according to exemplary embodiments.
Figure 37:
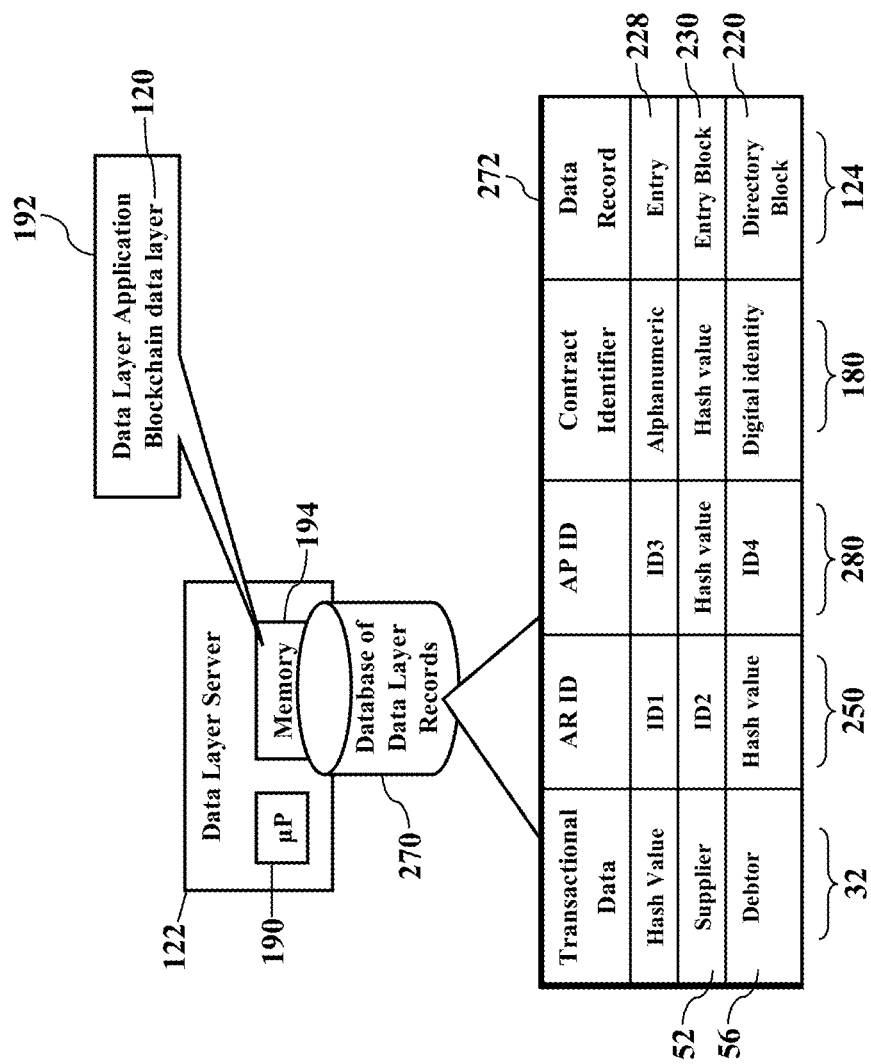

FIGS. 36-37 are more detailed illustrations of the account payable 100, according to exemplary embodiments. The debtor's server 102 sends the blockchain 30 to the network address associated with the data layer server 122 that generates the blockchain data layer 120. The blockchain 30 may contain the electronic transactional data 32 describing the account payable 100 (perhaps as one or more hashed blocks of data). For example, the electronic transactional data 32 may include an account payable identifier 280 that is assigned to the account payable 100. The account payable identifier 280 uniquely identifies the account payable 100. While the account payable identifier 280 may have any structure or form, the account payable identifier 280 is perhaps best understood as a unique alphanumeric or ASCII string that is assigned by the debtor's accounting software application 104. If the account payable identifier 280 is hashed (using the hashing algorithm 176), the resulting hash value 178 uniquely identifies any blocks 28 of data in the blockchain 30 that reference the account payable 100. The account payable identifier 280 may additionally or alternatively be separately sent from the debtor's server 102 to the data layer server 122. Because the electronic transactional data 32 (and/or its corresponding hash value(s) 178) is an identifiable input to the data layer server 122 generating the blockchain data layer 120, the data records 124 may also carry or reference any portion of the electronic transactional data 32. For example, any of the data records 124 may also reference, be identified by, or be associated with the supplier 52, the debtor 56, and/or the account payable identifier 280. Any of the electronic transactional data 32 may thus be a common indicator or reference data for tracking any transaction records documenting payments 40 on the account payable 100. As a simple example, once the account payable identifier 280 is assigned to the account payable 100, any of the data records 124 in the blockchain data layer 120 may thus be commonly mapped or identified by the account payable identifier 280 that is uniquely associated with the account payable 100.

FIG. 37 also illustrates the database 270 of data layer records. The database 270 of data layer records may be a comprehensive repository that relates any electronic transactional data 32 (such as the supplier 52 and/or debtor 56) to its corresponding account receivable identifier 250, account payable identifier 280, contract identifier 180, and/or entry 228, entry block 230, and directory block 220 within the blockchain data layer 120. The data layer server 122 may thus quickly and easily query the database 270 of data layer records for any of the electronic transactional data 32 (and/or its corresponding hash value) and identify and/or retrieve any corresponding data records 124. Any electronic transactional data 32 may thus be mapped or associated with the database entries in the database 270 of data layer records. Again, any of the database entries may be retrieved and chronologically arranged to reveal any sequence or series of payments and transactions.

Figure 38:
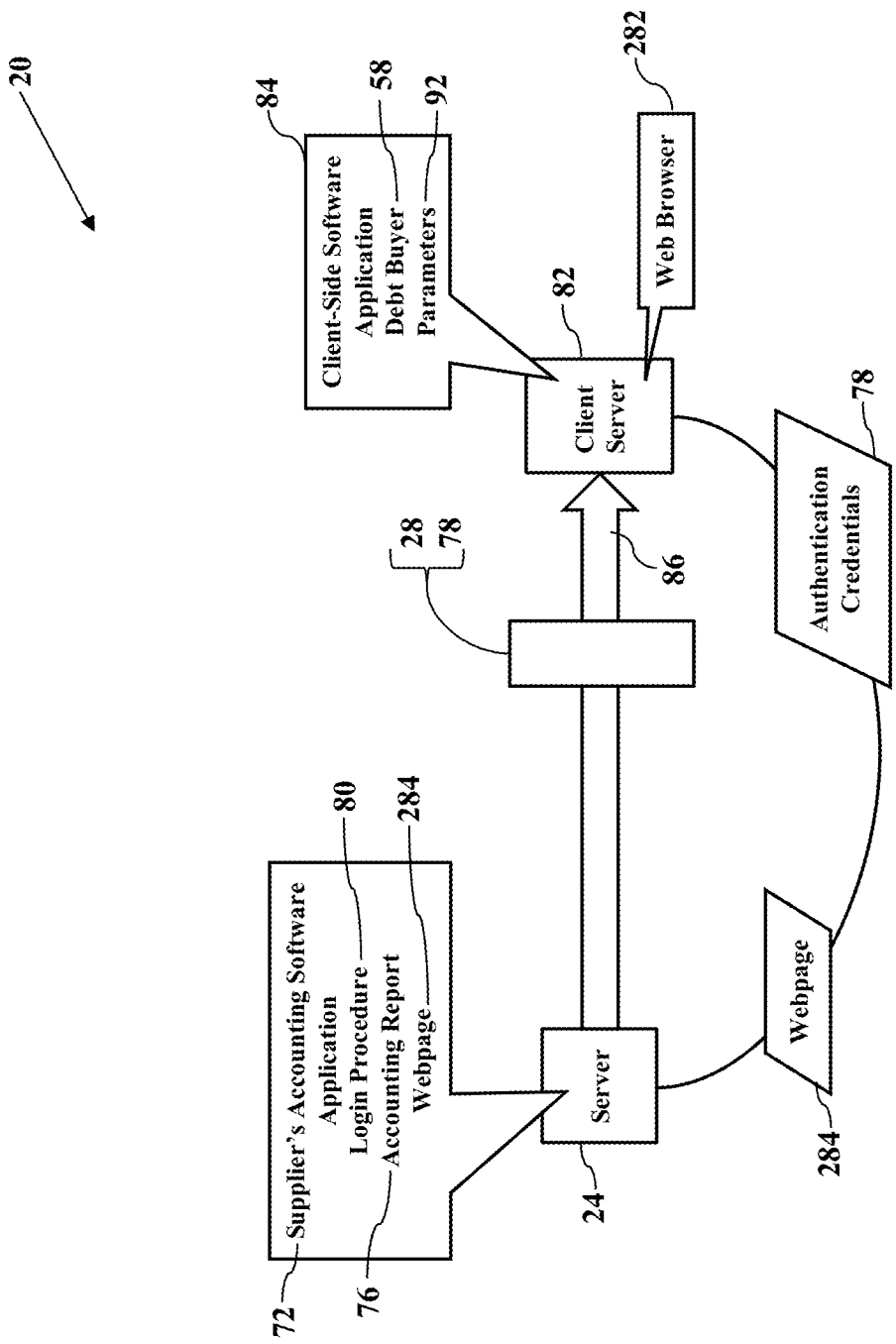
FIGS. 38-39 illustrate login procedures, according to exemplary embodiments.

FIG. 38 illustrates the login procedure 80, according to exemplary embodiments. As this disclosure above explained, the client server 82 may receive the blockchain 30, read the supplier's authentication credentials 78, log in to the supplier's accounting software application 72, and access the supplier's accounting report 76. While any access mechanism may be used, most readers are thought familiar with online or Internet web access. That is, the client-side software application 84 calls or invokes a web browser 282 to request and download a webpage 284. The webpage 284 is processed and its login procedure 80 is autogenerated and/or completed using the authentication credentials 78 specified by the blockchain 30. When the client server 82 authenticates to the supplier's accounting software application 72, the client-side software application 84 and/or the web browser 282 may then request and download the supplier's accounting report 76 (perhaps formatted as an extensible markup language document). The client server 82 reads any data contained within the supplier's accounting report 76 and may compare to the decisional parameters 92. Any third-party debt buyer 58 may thus conduct automated due diligence before purchasing the account receivable 50.

Figure 39:
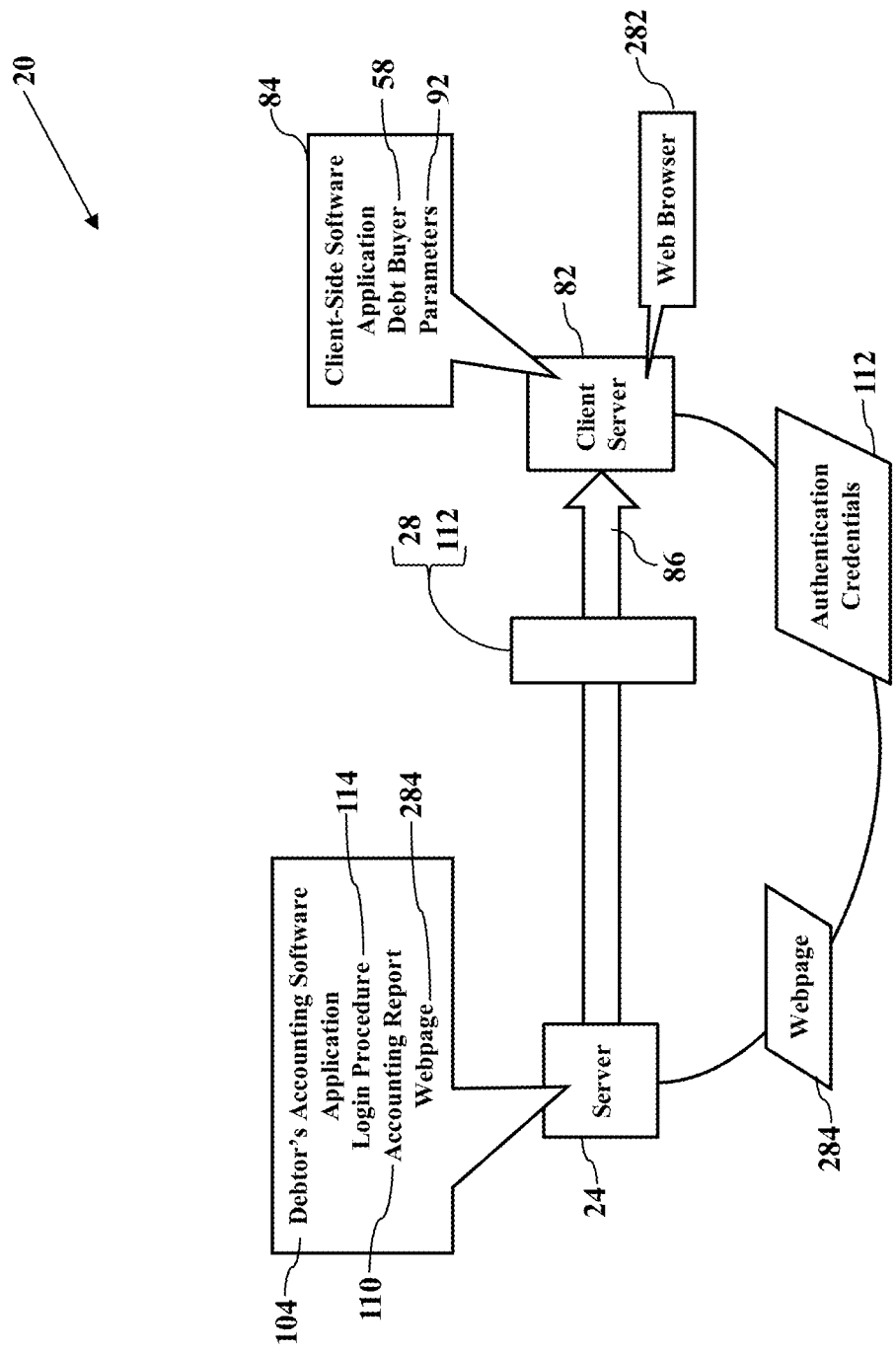

FIG. 39 illustrates the login procedure 114, according to exemplary embodiments. As this disclosure above explained, the client server 82 may receive the blockchain 30, read the debtor's authentication credentials 112, log in to the debtor's accounting software application 104, and access the debtor's accounting report 110. Again, while any access mechanism may be used, FIG. 39 illustrates web access. That is, the client-side software application 84 calls or invokes the web browser 282 to request and download the debtor's accounting report 110 as the webpage 284. The webpage 284 is processed and its login procedure 114 is autogenerated and/or completed using the authentication credentials 112 specified by the blockchain 30. When the client server 82 authenticates to the debtor's accounting software application 104, the client-side software application 84 and/or the web browser 282 may then request and download the debtor's accounting report 110 (perhaps formatted as an extensible markup language document). The client server 82 reads any data contained within the debtor's accounting report 110 and may compare to the decisional parameters 92. Any third-party debt buyer 58 may thus conduct automated due diligence before purchasing the account receivable 50 and/or the account payable 100.

The login procedures 80 and 114 may also be performed by the data layer server 122. This disclosure above explains that the data layer server 122 may receive the blockchain 30 sent from the server 24 and/or the debtor server 102 (see, for example, FIGS. 18-19). Because the blockchain 30 may specify the supplier's authentication credentials 78 and/or the debtor's authentication credentials 112, the data layer server 122 may log in to the accounting software applications 72 and/or 104 and retrieve the accounting reports 76 and 110. The data layer application 192 may utilize Internet online web access via the web browser 282 to request and download the accounting reports 76 and 110 as the one or more webpages 284. The data layer application 192 may read any data contained within the accounting reports 76 and 110 and may compare to the decisional parameters 92. Any third-party debt buyer 58 may thus conduct automated due diligence before purchasing the account receivable 50.

Figure 40:
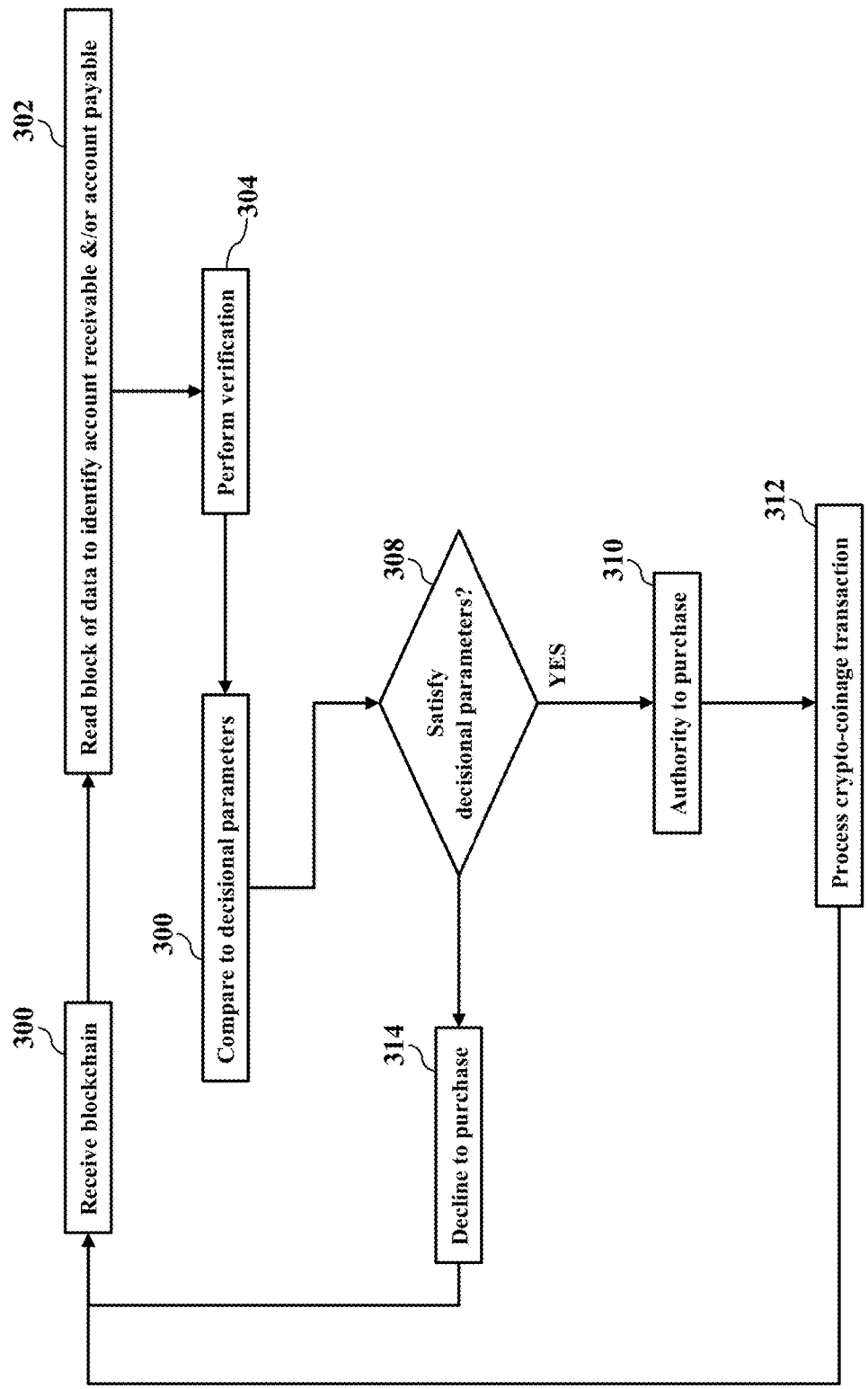
FIG. 40 is a flowchart illustrating a method or algorithm for debt transactions, according to exemplary embodiments.

FIG. 40 is a flowchart illustrating a method or algorithm for debt transactions, according to exemplary embodiments. The blockchain 30 is received (Block 300) and the block 28 of data is read to identify data representing the account receivable 50 and/or the account payable 100 (Block 302). The verification 60 may be performed as due diligence (Block 304). The account receivable 50 and/or the account payable 100 may be compared to the decisional parameters 92 (Block 306). If the account receivable 50 and/or the account payable 100 satisfies the decisional parameters 92 (Block 308), then the smart contract 86 may have authority to purchase the account receivable 50 (Block 310). The smart contract 86 may conduct an electronic financial transaction (such as a crypto-coinage transaction) associated with the purchase of the account receivable 50 (Block 312). However, if the account receivable 50 and/or the account payable 100 fails to satisfy the decisional parameters 92 (Block 308), then the smart contract 86 may decline to purchase the account receivable 50 (Block 314).

Figure 41:
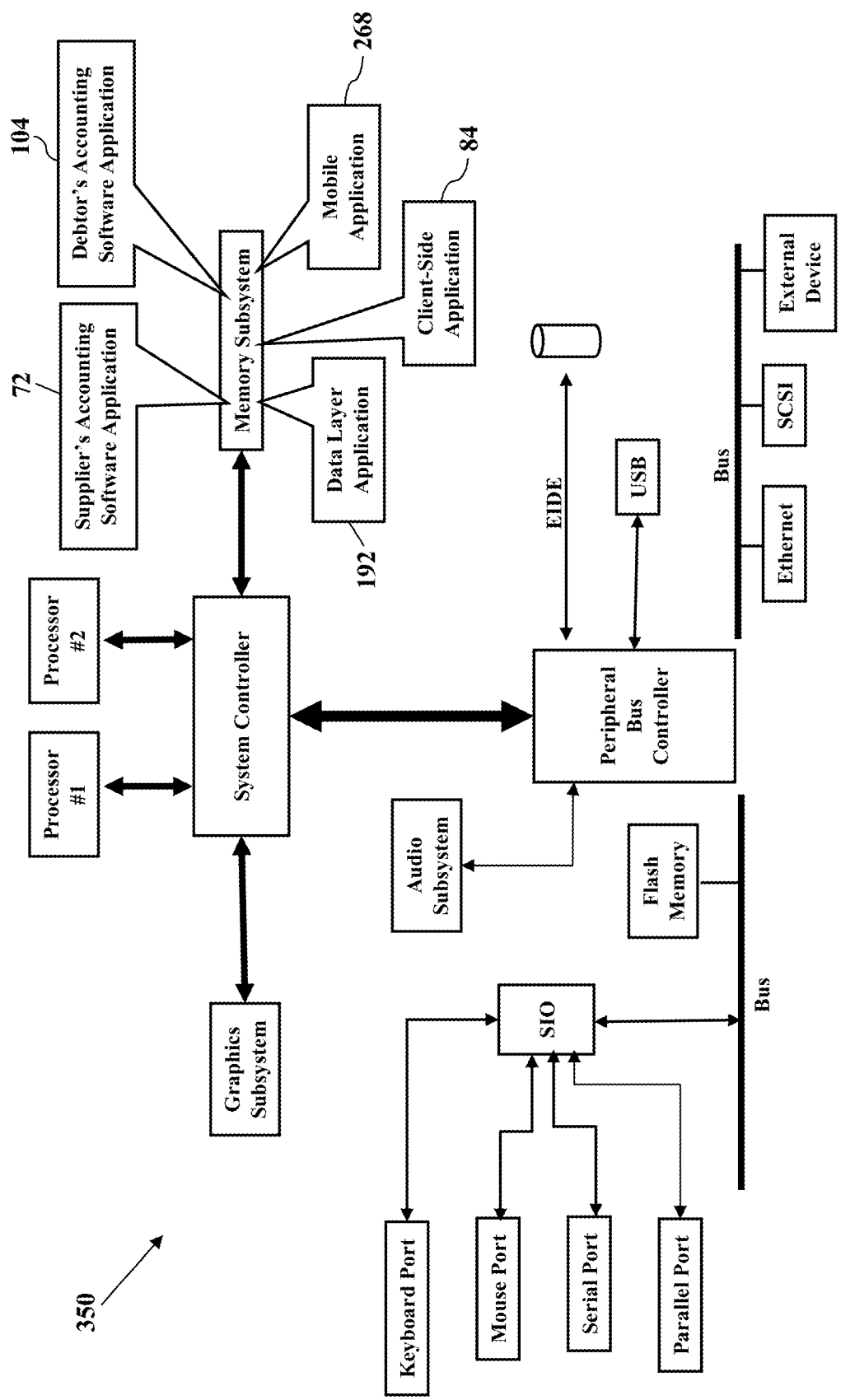
FIGS. 41-42 depict still more operating environments for additional aspects of the exemplary embodiments.

FIG. 41 is a schematic illustrating still more exemplary embodiments. FIG. 41 is a more detailed diagram illustrating a processor-controlled device 350. As earlier paragraphs explained, the supplier's accounting software application 72, the client-side software application 84, the debtor's accounting software application 104, the data layer application 192, and the mobile application 268 may partially or entirely operate in any mobile or stationary processor-controlled device. FIG. 41, then, illustrates the supplier's accounting software application 72, the client-side software application 84, the debtor's accounting software application 104, the data layer application 192, and the mobile application 268 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 42:
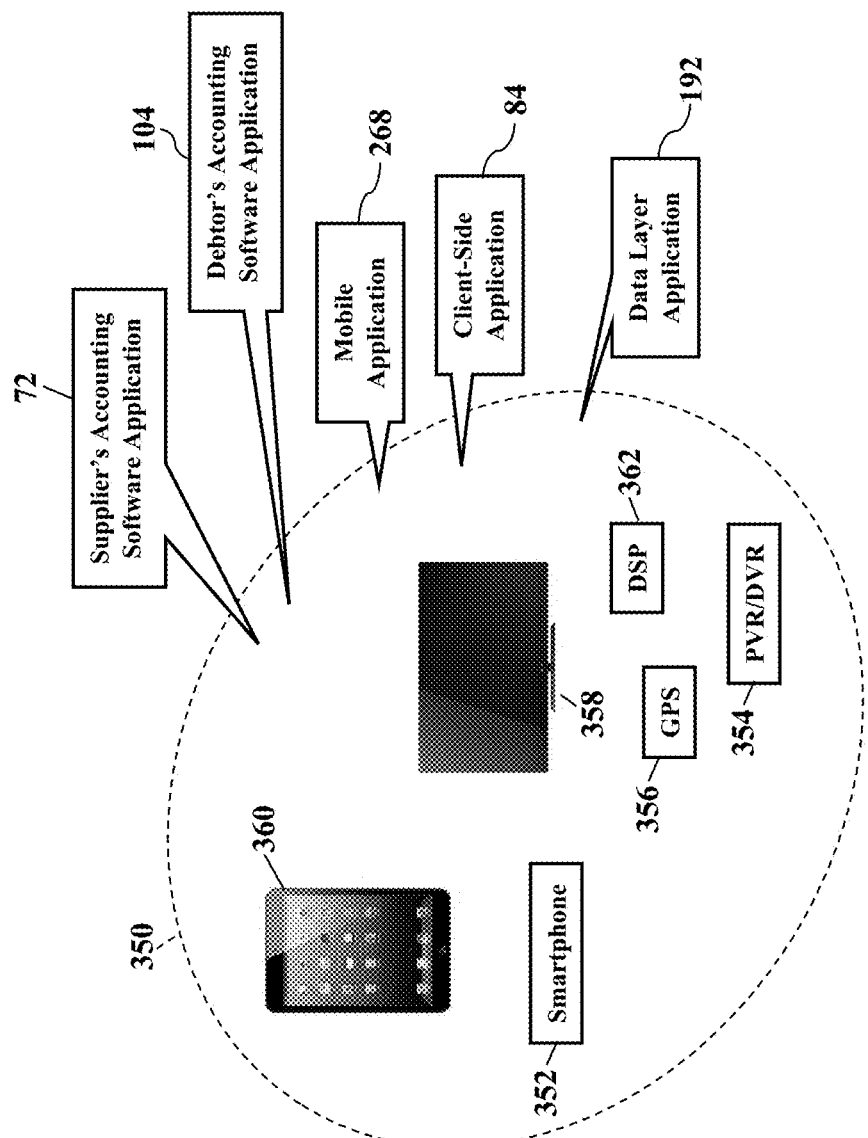

FIG. 42 depicts other possible operating environments for additional aspects of the exemplary embodiments. FIG. 42 illustrates the supplier's accounting software application 72, the client-side software application 84, the debtor's accounting software application 104, the data layer application 192, and the mobile application 268 operating within various other processor-controlled devices 350. FIG. 42, for example, illustrates that the supplier's accounting software application 72, the client-side software application 84, the debtor's accounting software application 104, the data layer application 192, and the mobile application 268 may entirely or partially operate within a set-top box ("STB") or other media player (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH and any other.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for recording debt in the blockchain marketplace 20, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method performed by a server that executes a digital contract, comprising:
    receiving, by the server, a blockchain specifying an authentication credential generated by an accounting software application, the authentication credential associated with an account receivable registered to the blockchain;
    authenticating, by the server, to the accounting software application using the authentication credential specified by the blockchain;
    in the response to the authenticating to the accounting software application using the authentication credential specified by the blockchain, retrieving, by the server, an accounting report of the account receivable; and
    executing, by the server, the digital contract based on the accounting report of the account receivable.

2. The method of claim 1, further comprising identifying a hash value specified by the blockchain that identifies a debtor associated with the account receivable.

3. The method of claim 1, further comprising identifying a hash value specified by the blockchain that identifies a supplier associated with the account receivable.

4. The method of claim 1, further comprising encrypting the accounting report using a cryptographic key that is unique to a debtor associated with the account receivable.

5. The method of claim 1, further comprising encrypting the accounting report using a cryptographic key that is unique to a supplier associated with the account receivable.

6. The method of claim 1, further comprising encrypting the accounting report using a cryptographic key that is unique to the accounting software application.

7. The method of claim 1, further comprising identifying an invoice specified by the blockchain that is associated with the account receivable.

8. A system, comprising:
    a hardware processor; and
    a memory device, the memory device storing instructions that when executed by the hardware processor perform operations, the operations comprising:
    receiving a blockchain via the Internet, the blockchain specifying an authentication credential generated by an accounting software application, the authentication credential uniquely associated with an account receivable registered to the blockchain;
    authenticating to the accounting software application via the Internet using the authentication credential specified by the blockchain;
    in the response to the authenticating to the accounting software application using the authentication credential specified by the blockchain, retrieving an accounting report of the account receivable via the Internet; and
    executing a digital contract specified by the blockchain based on the accounting report of the account receivable.

9. The system of claim 8, wherein the operations further comprise identifying a hash value specified by the blockchain that identifies a debtor associated with the account receivable.

10. The system of claim 8, wherein the operations further comprise identifying a hash value specified by the blockchain that identifies a supplier associated with the account receivable.

11. The system of claim 8, wherein the operations further comprise encrypting the accounting report of the account receivable using a cryptographic key that is unique to a debtor associated with the account receivable.

12. The system of claim 8, wherein the operations further comprise encrypting the accounting report of the account receivable using a cryptographic key that is unique to a supplier associated with the account receivable.

13. The system of claim 8, wherein the operations further comprise encrypting the accounting report of the account receivable using a cryptographic key that is unique to the accounting software application.

14. The system of claim 8, wherein the operations further comprise identifying an invoice specified by the blockchain that is associated with the account receivable.

15. A memory device storing instructions that when executed by a hardware processor perform operations, the operations comprising:

receiving a blockchain via the Internet, the blockchain specifying an authentication credential uniquely generated by an accounting software application for accessing an accounting report associated with an account receivable registered to the blockchain;

authenticating via the Internet to the accounting software application using the authentication credential specified by the blockchain;

in the response to the authenticating to the accounting software application using the authentication credential specified by the blockchain retrieving via the Internet the accounting report of the account receivable; and executing a digital contract specified by the blockchain based on the accounting report of the account receivable.

16. The memory device of claim 15, wherein the operations further comprise identifying a hash value specified by the blockchain that identifies a debtor associated with the account receivable.

17. The memory device of claim 15, wherein the operations further comprise identifying a hash value specified by the blockchain that identifies a supplier associated with the account receivable.

18. The memory device of claim 15, wherein the operations further comprise encrypting the report of the account receivable using a cryptographic key that is unique to a debtor associated with the account receivable.

19. The memory device of claim 15, wherein the operations further comprise encrypting the report of the account receivable using a cryptographic key that is unique to a supplier associated with the account receivable.

20. The memory device of claim 15, wherein the operations further comprise encrypting the report of the account receivable using a cryptographic key that is unique to the accounting software application.

* * * * *